United States Patent
Sugita et al.

(10) Patent No.: US 9,811,216 B2
(45) Date of Patent: Nov. 7, 2017

(54) DISPLAY DEVICE, PORTABLE TERMINAL, MONITOR, TELEVISION, AND METHOD FOR CONTROLLING DISPLAY DEVICE

(71) Applicant: Sharp Kabushiki Kaisha, Osaka-shi, Osaka (JP)

(72) Inventors: Yasuhiro Sugita, Osaka (JP); Tomohiro Kimura, Osaka (JP); Shinji Yamagishi, Osaka (JP); Hiroyuki Ogawa, Osaka (JP); Kohji Fujiwara, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 17 days.

(21) Appl. No.: 14/427,743

(22) PCT Filed: Sep. 13, 2013

(86) PCT No.: PCT/JP2013/074936
§ 371 (c)(1),
(2) Date: Mar. 12, 2015

(87) PCT Pub. No.: WO2014/042258
PCT Pub. Date: Mar. 20, 2014

(65) Prior Publication Data
US 2015/0261347 A1    Sep. 17, 2015

(30) Foreign Application Priority Data

Sep. 14, 2012  (JP) ................................ 2012-203620

(51) Int. Cl.
*G06F 3/045* (2006.01)
*G06F 3/041* (2006.01)
(Continued)

(52) U.S. Cl.
CPC ............. *G06F 3/044* (2013.01); *G06F 1/1626* (2013.01); *G06F 2203/04112* (2013.01);
(Continued)

(58) Field of Classification Search
CPC ......... G06F 3/041; G06F 3/044; G06F 3/0412
See application file for complete search history.

(56) References Cited

U.S. PATENT DOCUMENTS 6,452,514 B1    9/2002  Philipp
2003/0030673 A1*  2/2003  Ho ...................... G06F 3/03547
                                                              715/779

(Continued)

FOREIGN PATENT DOCUMENTS

CN    201174007 Y    12/2008
JP    2004-302734 A  10/2004
(Continued)

OTHER PUBLICATIONS

Official Communication issued in International Patent Application No. PCT/JP2013/074936, dated Dec. 17, 2013.

*Primary Examiner* — Nan-Ying Yang
(74) *Attorney, Agent, or Firm* — Keating & Bennett, LLP

(57) ABSTRACT

A display device (1) includes a display panel (12), a touch panel (14) for detecting contact of a target object with a display region (P) of the display panel (12) or approach thereto to the display region (P), and a casing (17) containing the display panel (12) and the touch panel (14), a minimum distance (d) between the touch panel (14) and an outside surface (A) being not larger than a detectable distance, within which the touch panel (14) is capable of detecting the contact of the target object with the outside surface (A) or the approach thereof to the outside surface (A).

19 Claims, 25 Drawing Sheets

(51) Int. Cl.
*G06F 3/044* (2006.01)
*G06F 1/16* (2006.01)
*G09G 5/00* (2006.01)

(52) U.S. Cl.
CPC ..... *G09G 5/003* (2013.01); *G09G 2300/0404* (2013.01); *G09G 2354/00* (2013.01)

(56) References Cited

U.S. PATENT DOCUMENTS

| | | | |
|---|---|---|---|
| 2005/0012723 A1* | 1/2005 | Pallakoff | G06F 1/1616 345/173 |
| 2012/0013562 A1* | 1/2012 | Jyonoshita | G06F 3/0416 345/173 |
| 2012/0066591 A1* | 3/2012 | Hackwell | G06F 3/0483 715/702 |
| 2012/0218274 A1 | 8/2012 | Sato et al. | |
| 2013/0135795 A1* | 5/2013 | Shen | G02F 1/133608 361/679.01 |
| 2013/0271426 A1 | 10/2013 | Yumoto et al. | |
| 2014/0132541 A1 | 5/2014 | Miyamoto et al. | |
| 2014/0132561 A1 | 5/2014 | Miyamoto et al. | |
| 2014/0152602 A1 | 6/2014 | Miyamoto et al. | |
| 2014/0160070 A1 | 6/2014 | Miyamoto et al. | |

FOREIGN PATENT DOCUMENTS

| | | |
|---|---|---|
| JP | 2010-503127 A | 1/2010 |
| JP | 4955116 B1 | 6/2012 |
| JP | 2012-174248 A | 9/2012 |
| JP | 2012-174252 A | 9/2012 |
| WO | 20081030976 A2 | 3/2008 |

* cited by examiner

Activate camera or set camera ready for activation

Unlock

Activate game application or set
game application ready for activation

US 9,811,216 B2

DISPLAY DEVICE, PORTABLE TERMINAL, MONITOR, TELEVISION, AND METHOD FOR CONTROLLING DISPLAY DEVICE

TECHNICAL FIELD

The present invention relates to, for example, a display device for displaying an image.

BACKGROUND ART

Recent years have seen developments of a display device including a touch panel. An example of such a display device is disclosed in Patent Literature 1.

Patent Literature 1 discloses a portable multifunction device 500 (see FIG. 28) including a touch screen 503 having a touch sensing surface for accepting an input performed by a user through contact or the like. The portable multifunction device 500 detects, for example, contact with the touch screen 503 and converts the contact into a user interface object (for example, an icon) displayed on the touch screen 503 for an intuitive user operation.

For instance, in the case where the portable multifunction device 500 illustrated in FIG. 28 has detected a single-finger parallel motion gesture 504, the portable multifunction device 500, in response to that gesture, moves both frame content 507 and content 505 in parallel with the gesture to display a hidden portion of the page content. In the case where the portable multifunction device 500 has detected a two-finger parallel motion gesture 506, the portable multifunction device 500, in response to that gesture, moves the frame content 507 in parallel with the gesture to display a hidden portion of the frame content 507 but does not move the other content 505 in parallel with the gesture.

Further, the portable multifunction device 500 disclosed in Patent Literature 1 includes on side surfaces thereof physical buttons such as a push button 502 and volume control buttons 503.

CITATION LIST

Patent Literature 1

Japanese Patent Application Publication (Translation of PCT Application), Tokuhyo, No. 2010-503127 (Publication Date: Jan. 28, 2010)

Patent Literature 2

U.S. Pat. No. 6,452,514 (Registration Date: Sep. 17, 2002)

Patent Literature 3

Japanese Patent Publication No. 4955116 (Registration Date: Mar. 23, 2012)

SUMMARY OF INVENTION

Technical Problem

The portable multifunction device 500 disclosed in Patent Literature 1, which allows the user to perform a planar operation on the touch screen 503 and detects the contact for an intuitive user operation, unfortunately lets the display image be hidden by a finger (or thumb [the same applies hereinafter]) or the like operating on the display image. The portable multifunction device 500 may thus cause the viewability and operability of the display image to decrease during the operation.

Further, the physical buttons on the side surfaces of the portable multifunction device 500 each have a complicated mechanism and often lack operation flexibility. In addition, physical buttons such as the above require the user to remember the arrangement of those various buttons and functions corresponding to the buttons, possibly decreasing the user's convenience.

The present invention has been accomplished to solve the above problem. It is an object of the present invention to provide, for example, a display device capable of preventing the viewability and operability of its display image from decreasing.

Solution to Problem

In order to solve the above problem, a display device of the present invention is a display device, including: a display screen; an operation detecting member overlapping with the display screen and configured to detect (i) contact of a target object with a display region of the display screen or (ii) approach of the target object to the display region of the display screen; and a casing containing the display screen and the operation detecting member, a minimum distance between the operation detecting member and an outside surface of the casing, the outside surface being separate from the display region, being not larger than a detectable distance, within which the operation detecting member is capable of detecting (i) the contact of the target object with the outside surface or (ii) the approach of the target object to the outside surface.

In order to solve the above problem, a display device of the present invention is a display device, including: a display screen; a first operation detecting member overlapping with the display screen and configured to detect (i) contact of a target object with a display region of the display screen or (ii) approach of the target object to the display region of the display screen; a casing containing the display screen and the first operation detecting member; and a second operation detecting member for detecting (i) the contact of the target object with an outside surface of the casing, the outside surface being separate from the display region and including an outer edge of the casing, or (ii) the approach of the target object to the outside surface.

In order to solve the above problem, a display device of the present invention is a display device for displaying an image, the display device including: an operation accepting section for, in order to control the image display, accepting an input operation performed with use of a target object at an outer edge of the display device.

In order to solve the above problem, a method of the present invention for controlling a display device is a method for controlling a display device for displaying an image, the method including the step of: in order to control the image display, accepting an input operation performed with use of a target object at an outer edge of the display device.

In order to solve the above problem, a display device of the present invention is a display device for displaying an image, the display device including: an operation accepting section for accepting an input operation performed with use of a target object at an outer edge of the display device; an execution control section for controlling execution of a predetermined function in response to the input operation accepted by the operation accepting section; and a display control section for displaying the image on a display screen in accordance with the execution of the predetermined function which execution is controlled by the execution control section.

In order to solve the above problem, a method of the present invention for controlling a display device is a method for controlling a display device for displaying an image, the method including the steps of: (a) accepting an input operation performed with use of a target object at an outer edge of the display device; (b) controlling execution of a predetermined function in response to the input operation accepted in the step (a); and (c) displaying the image on a display screen in accordance with the execution of the predetermined function which execution is controlled in the step (b).

Advantageous Effects of Invention

The display device and others of the present invention can each advantageously prevent the viewability and operability of its display image from decreasing.

Figure 7:
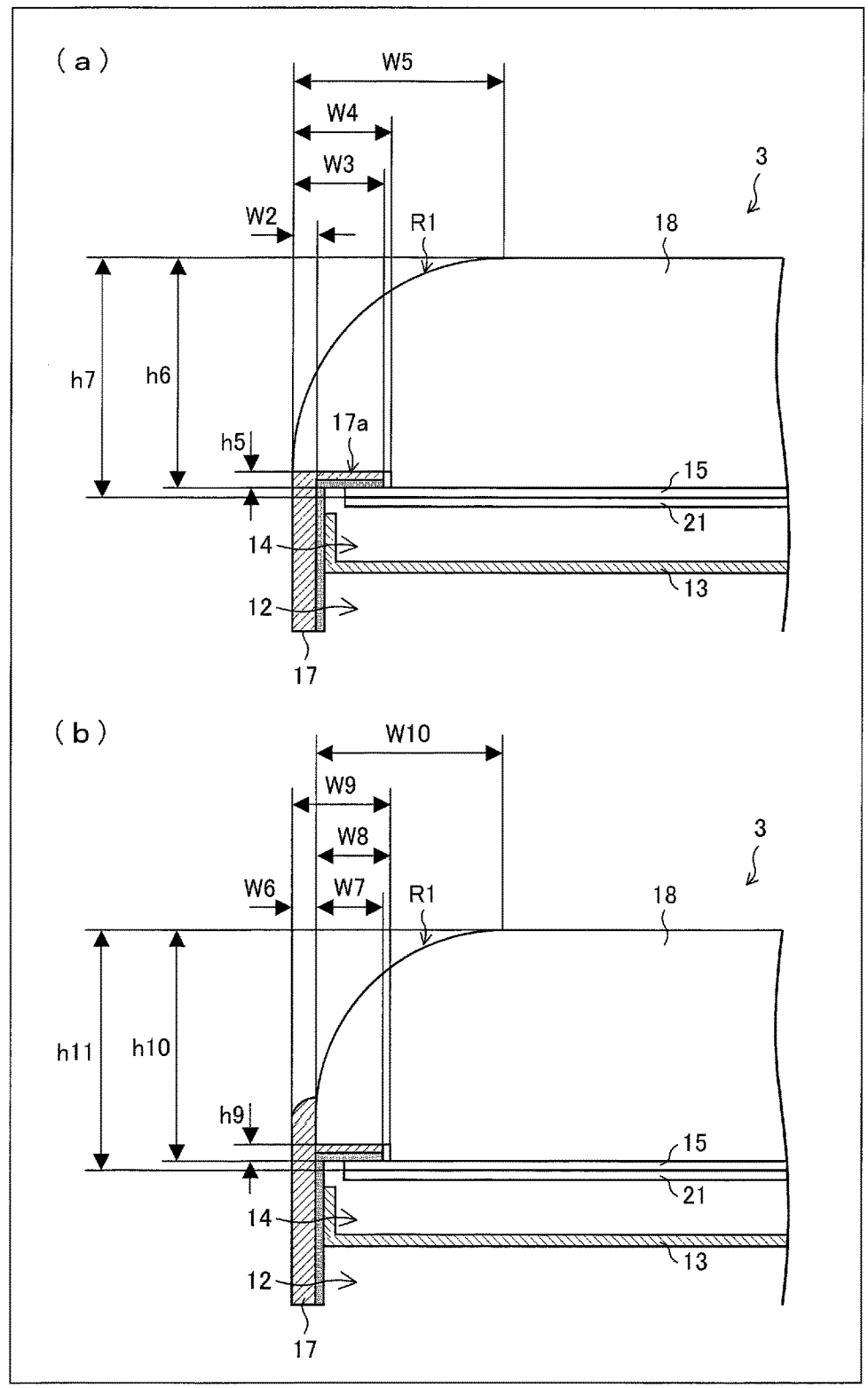

(a) and (b) of FIG. 7 are each a cross-sectional view of a display device included in the television, the cross-sectional view schematically illustrating an example configuration of the display device.

Figure 8:
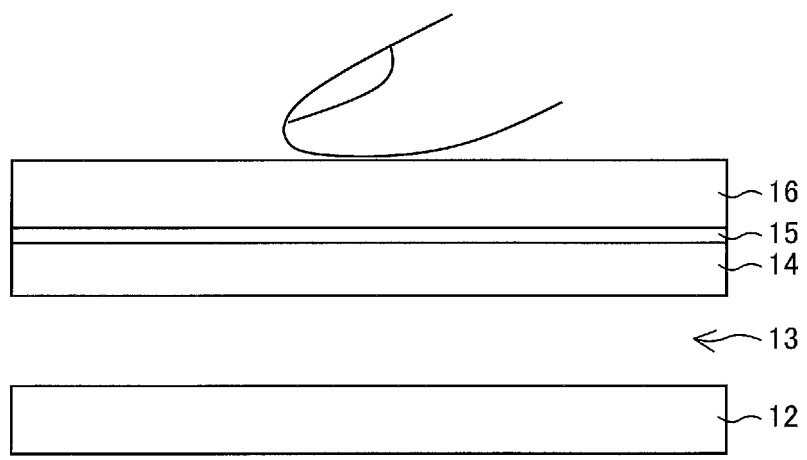

FIG. 8 is a cross-sectional view of a touch panel included in the display device, the cross-sectional view schematically illustrating a configuration of the touch panel.

Figure 9:
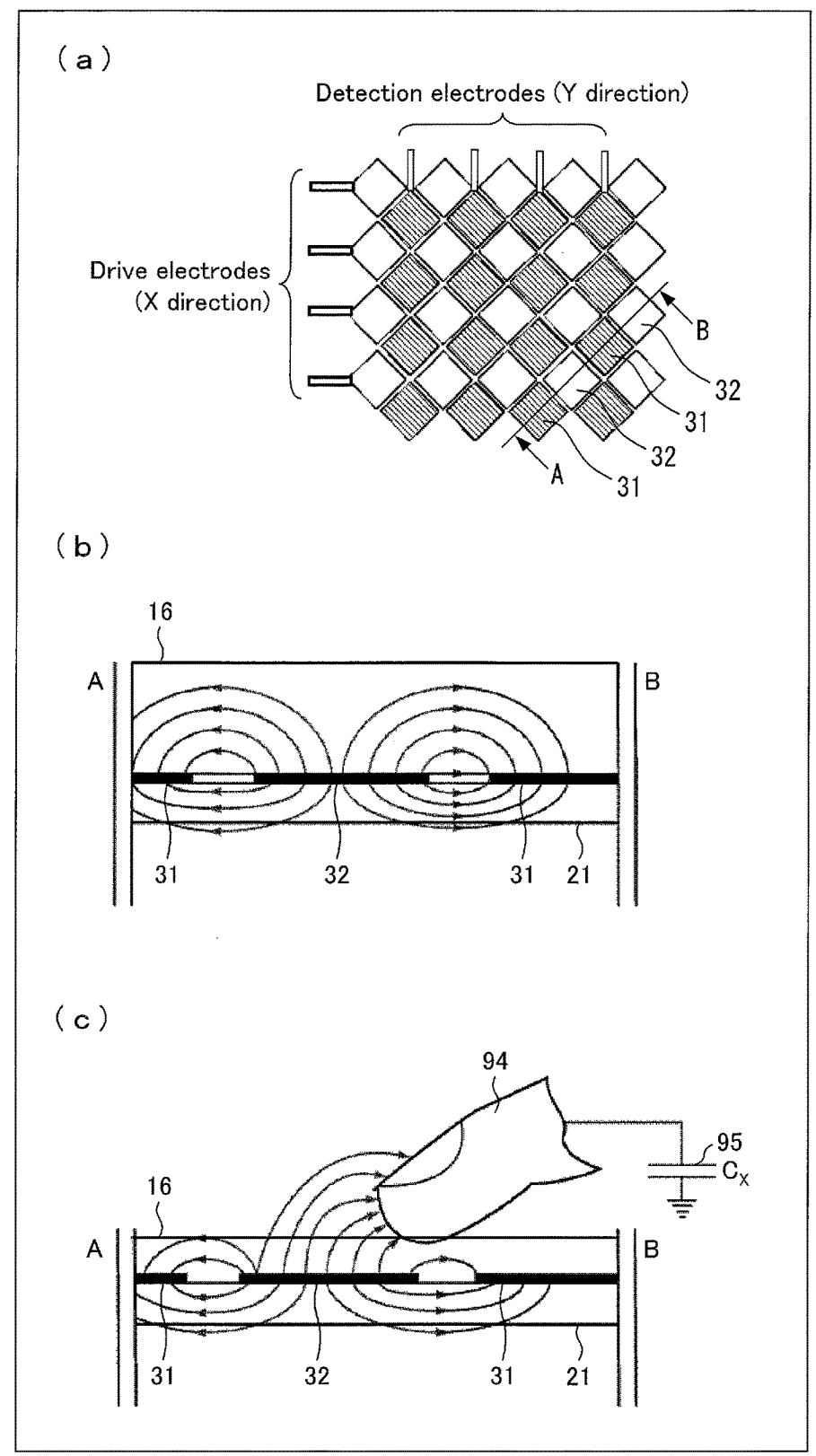

FIG. 9 shows plan views of an example capacitive touch panel, where (a) is a plan view of the touch panel, the plan view illustrating how electrodes of the touch panel are arranged, (b) is a A-B cross-sectional view of the touch panel, the cross-sectional view being taken along line A-B shown in (a), and (c) is a diagram illustrating an operation of the touch panel which operation is performed in the case where a finger (or thumb [the same applies hereinafter]) has touched the touch panel.

Figure 10:
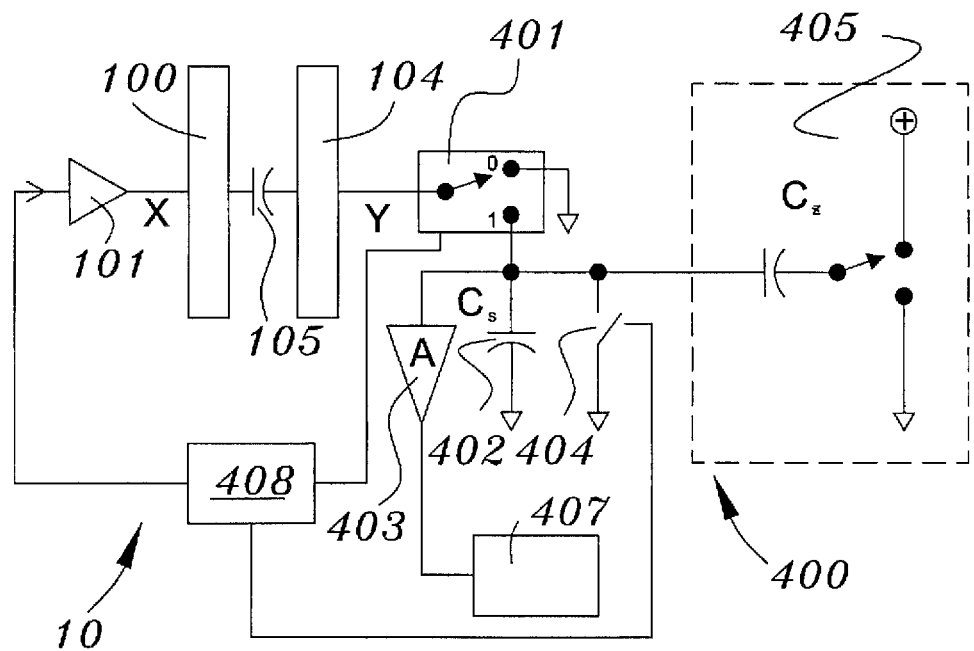

FIG. 10 is a circuit diagram illustrating a position detecting circuit for a mutual capacitive touch panel.

Figure 11:
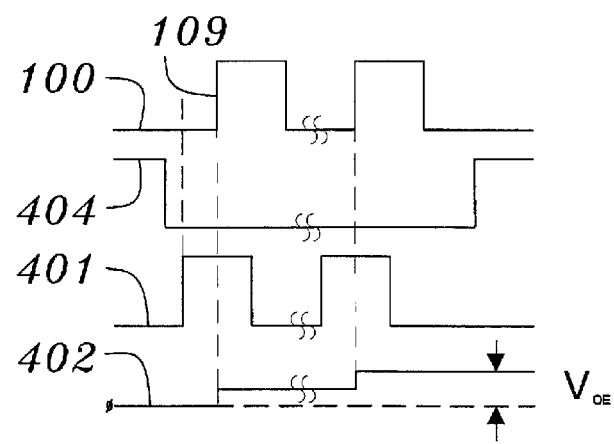

FIG. 11 is a timing chart illustrating an operation of the circuit illustrated in FIG. 9.

Figure 12:
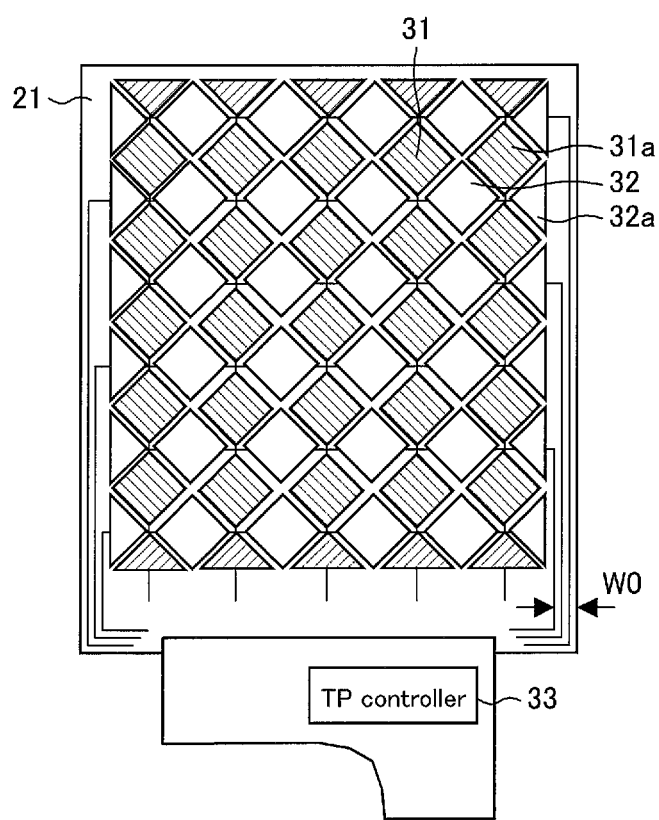

FIG. 12 is a top view of an example of the touch panel, the top view schematically illustrating the touch panel.

Figure 13:
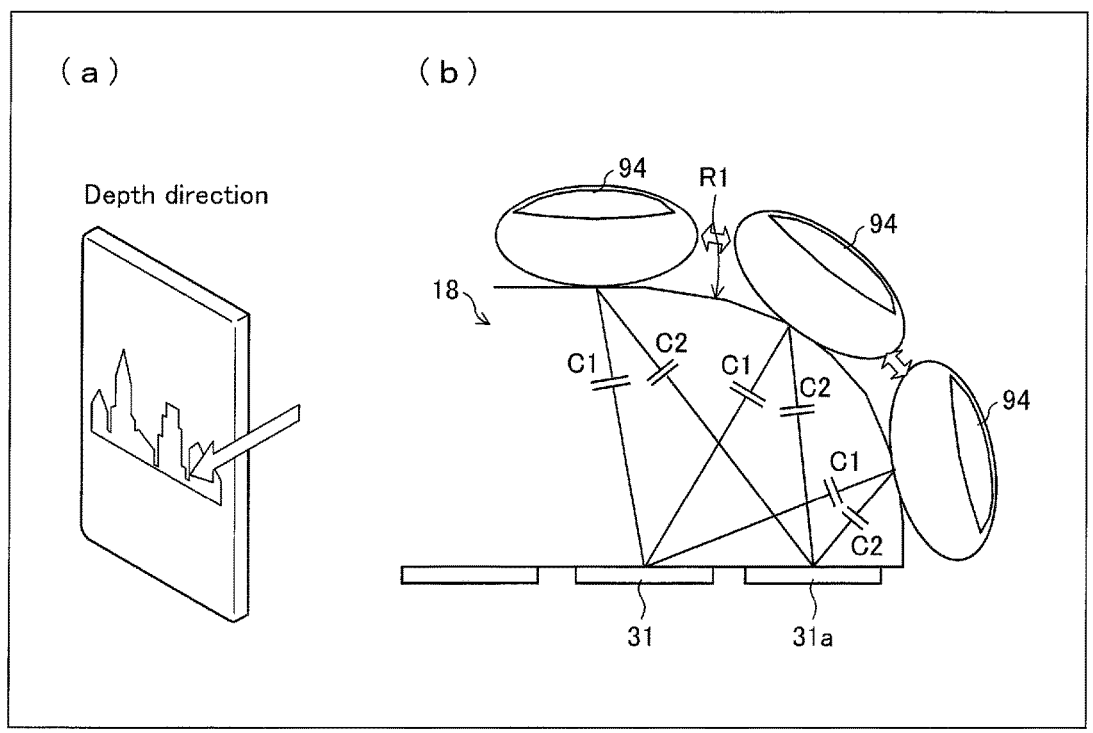

(a) and (b) of FIG. 13 are each a diagram illustrating a method for detecting an input operation performed in a depth direction.

Figure 14:
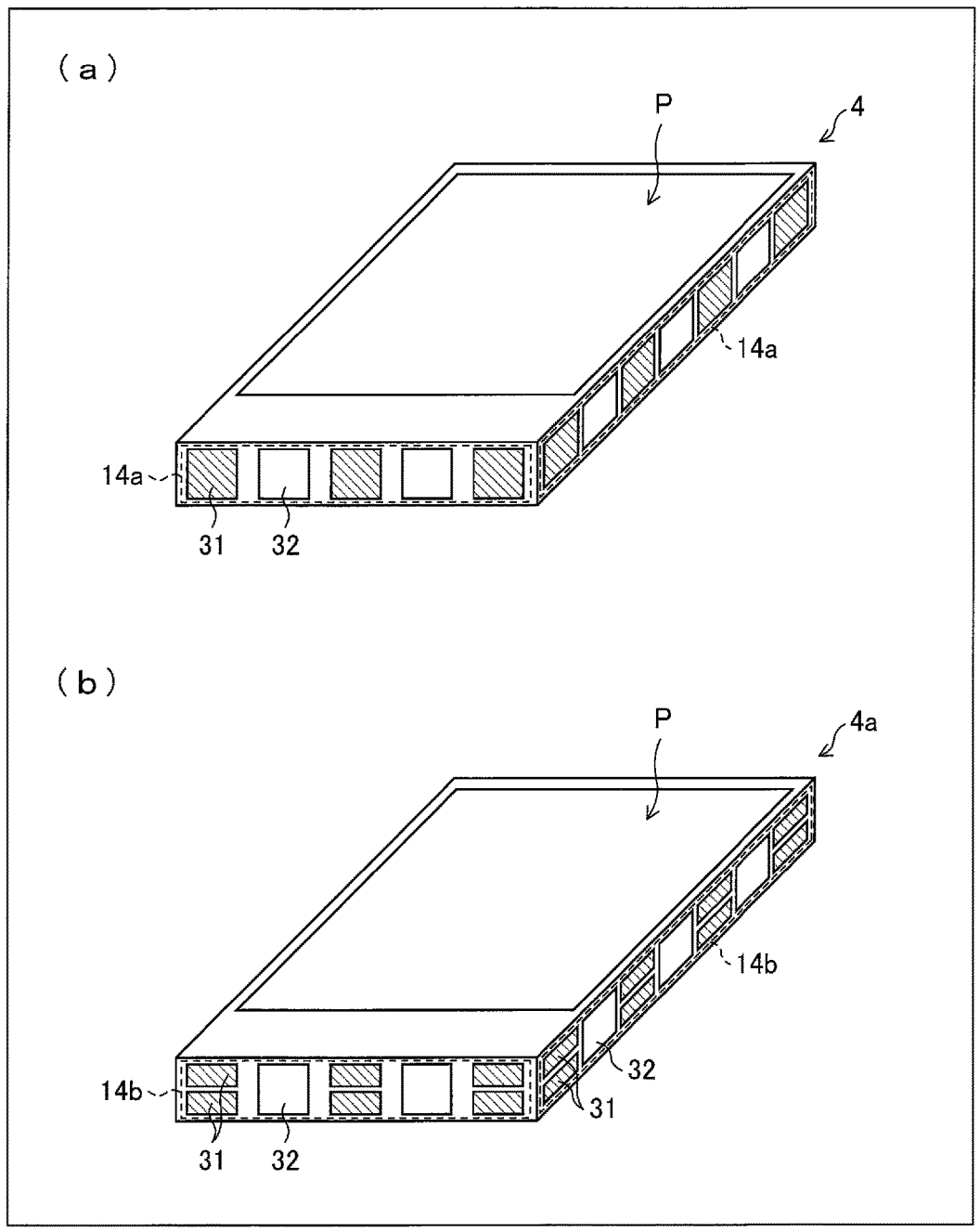

(a) and (b) of FIG. 14 are each a perspective view of a display device according to a variation of an embodiment of the present invention, the perspective view schematically illustrating an example configuration of the display device.

Figure 15:
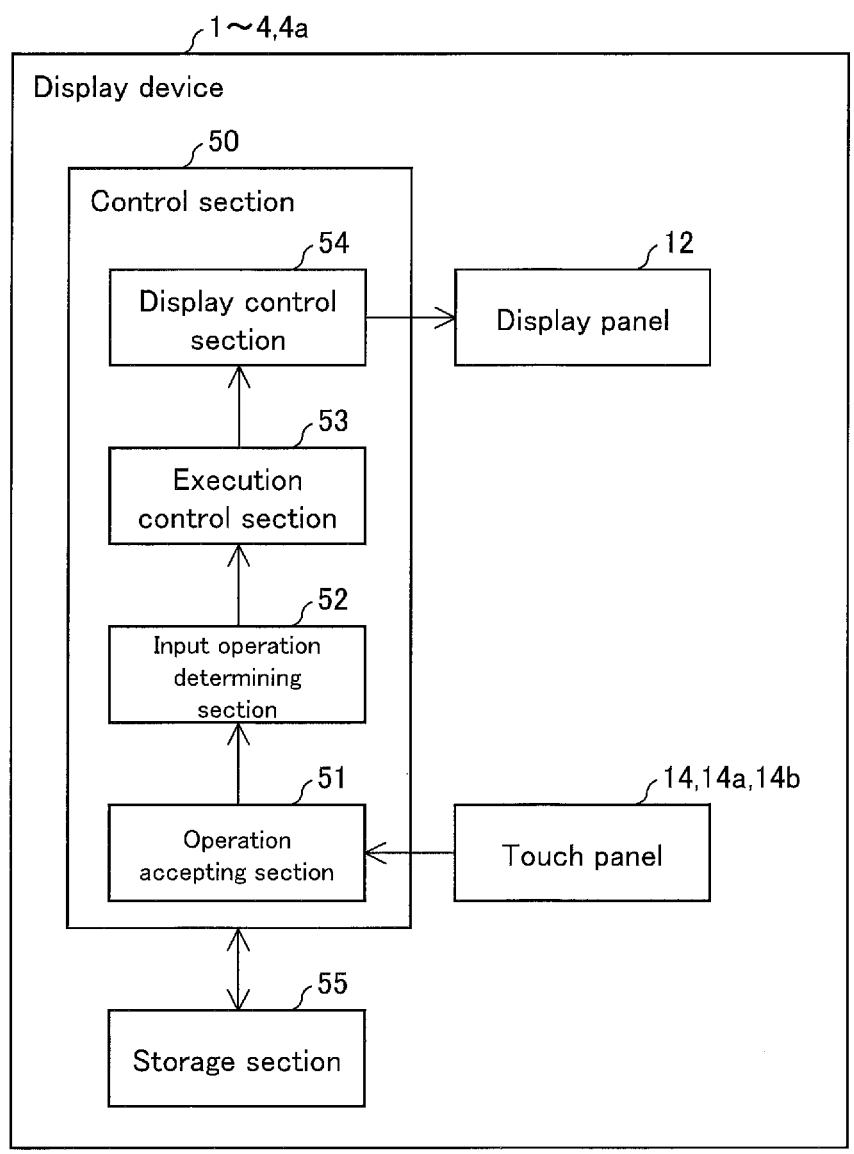

FIG. 15 is a functional block diagram schematically illustrating an example configuration of a control section included in each of the above display devices.

Figure 16:
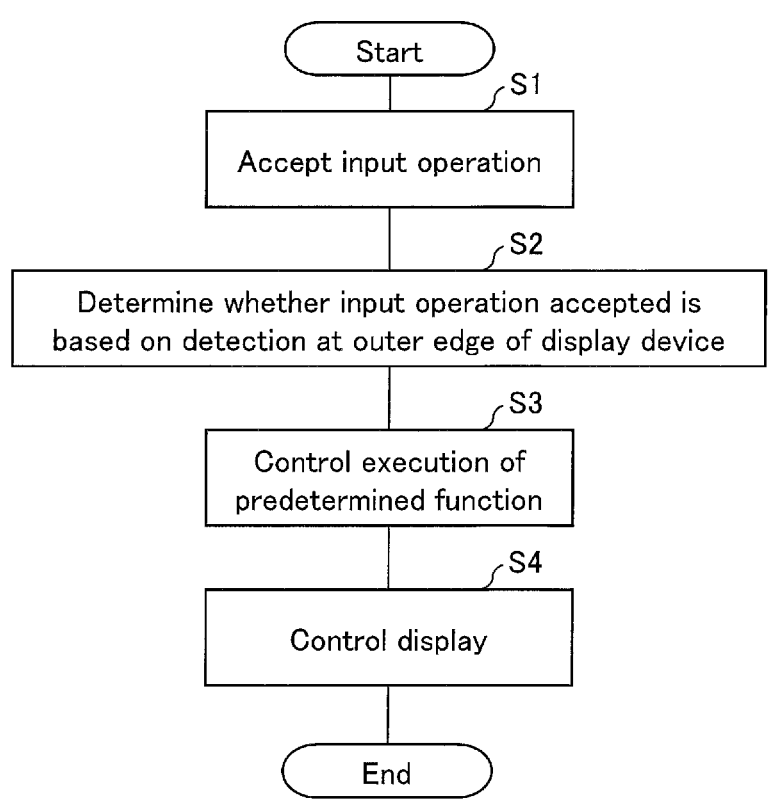

FIG. 16 is a flowchart illustrating an example process performed by the display devices.

Figure 17:
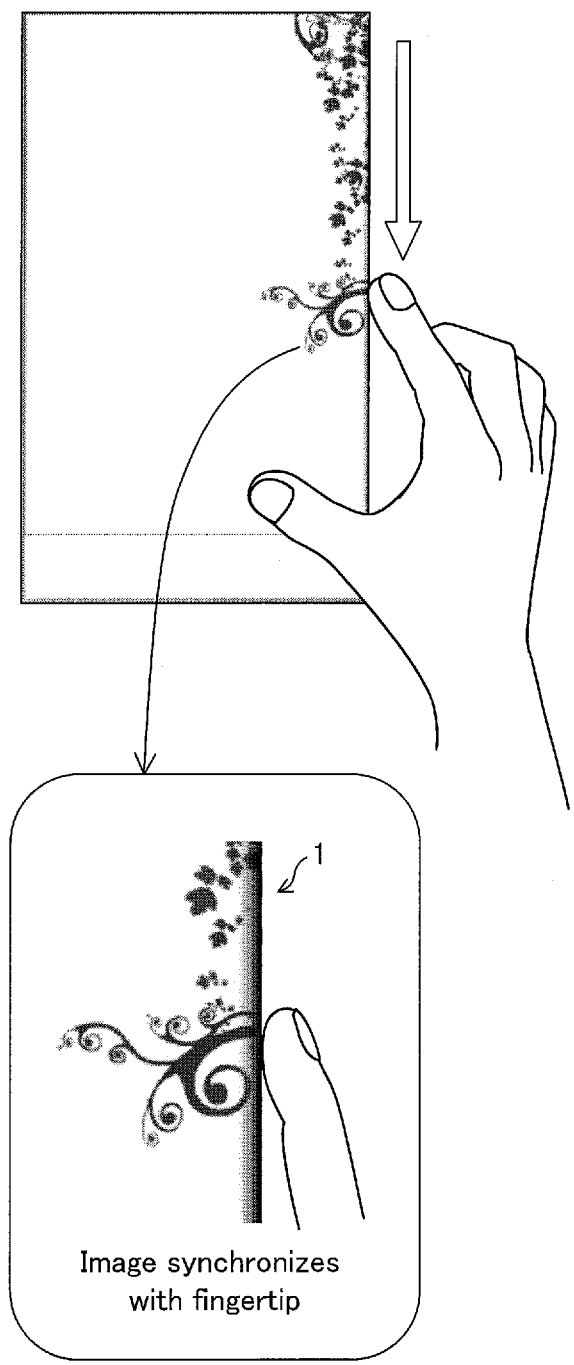

FIG. 17 is a diagram illustrating an example image displayed in the case where a finger is in contact with an outer edge of the display devices.

Figure 18:
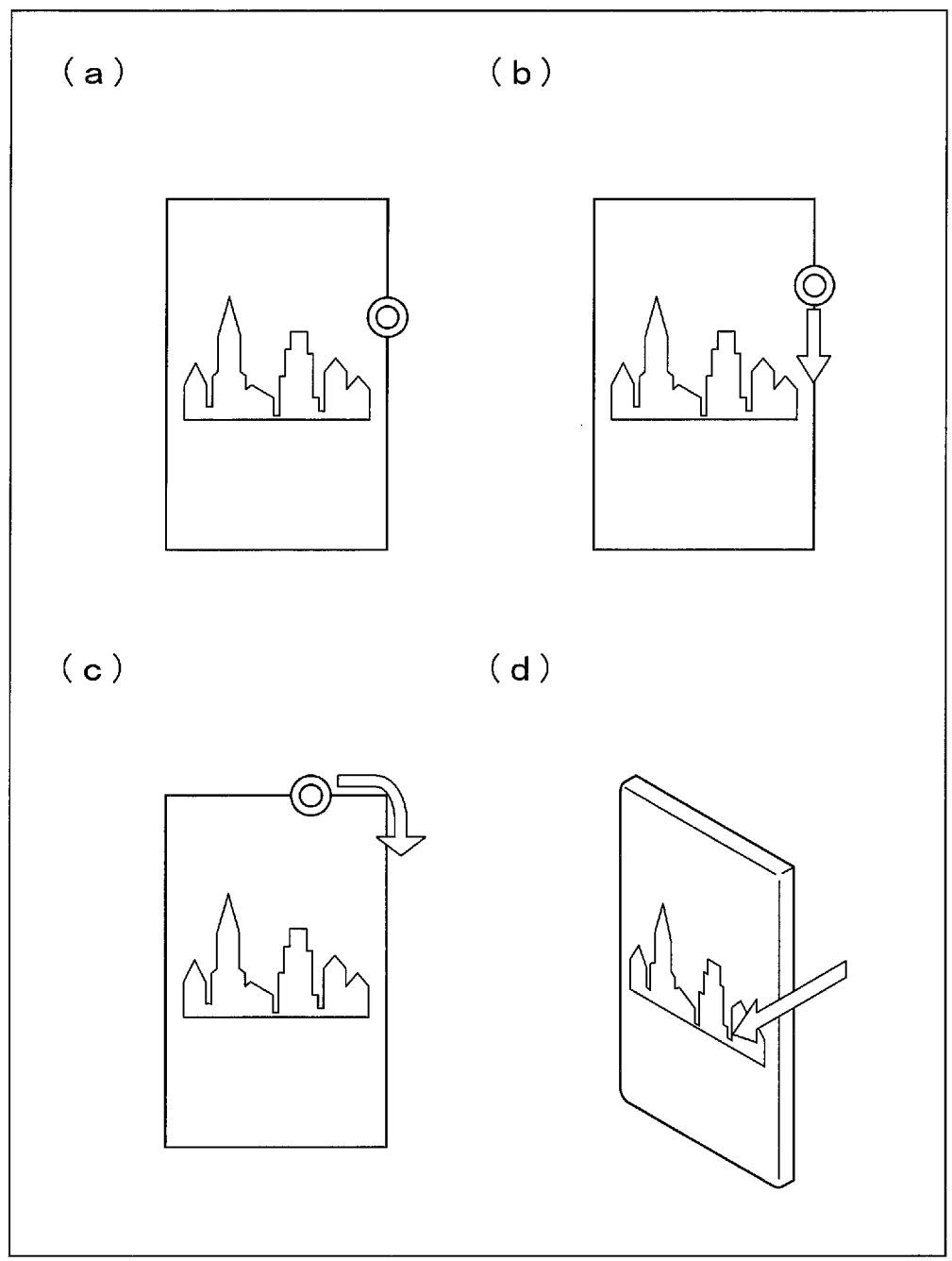

(a) to (d) of FIG. 18 are each a diagram illustrating an example input operation performed in the case where a finger is in contact with the outer edge of the display devices at a single position.

Figure 19:
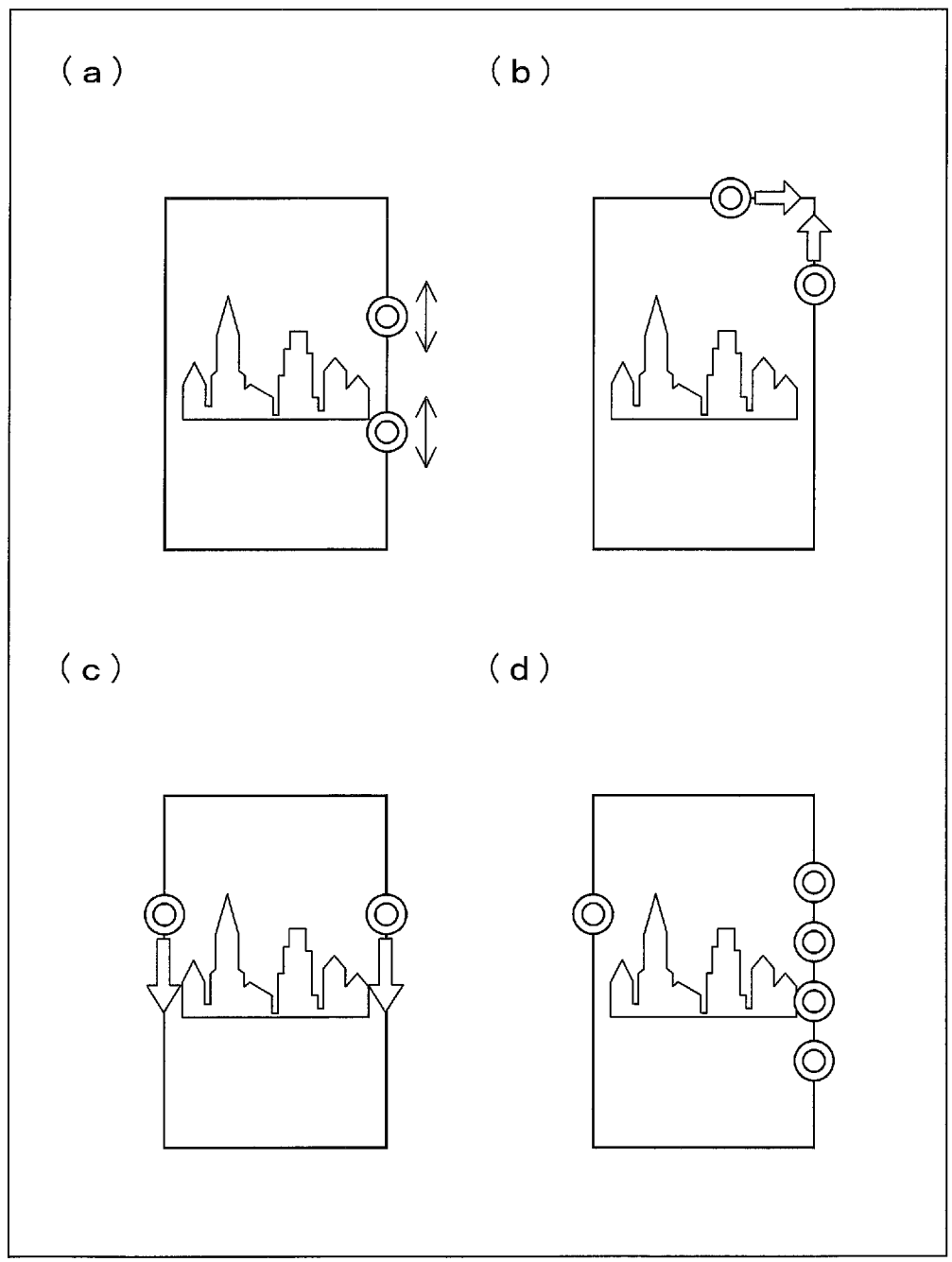

(a) to (d) of FIG. 19 are each a diagram illustrating an example input operation performed in the case where fingers are in contact with the outer edge of the display devices at a plurality of positions.

Figure 20:
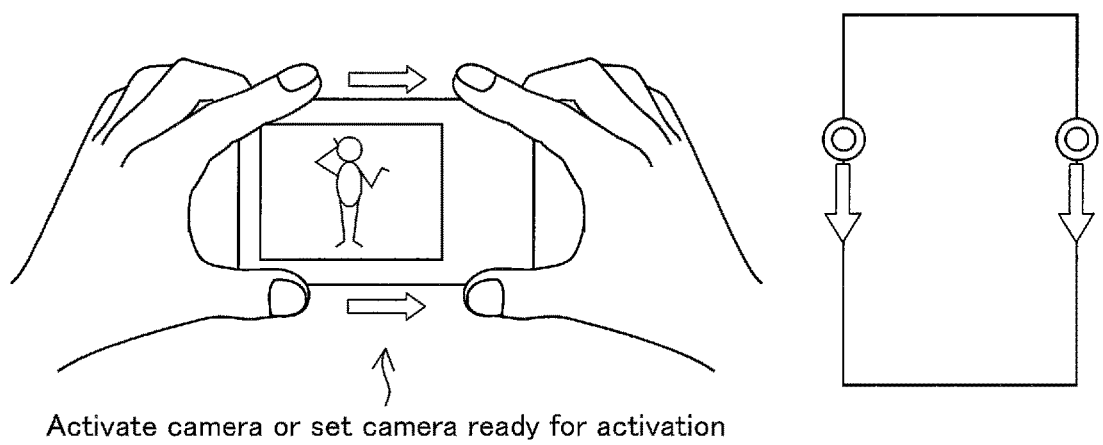

FIG. 20 shows diagrams each illustrating an example relationship between (i) an input operation at an outer edge of the display devices and (ii) a function to be performed.

Figure 21:
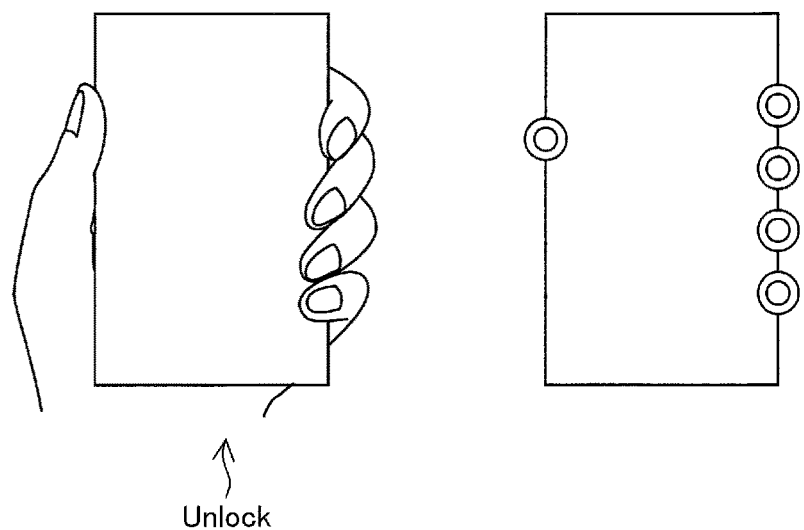

FIG. 21 shows diagrams each illustrating an example relationship between (i) an input operation at an outer edge of the display devices and (ii) a function to be performed.

Figure 22:
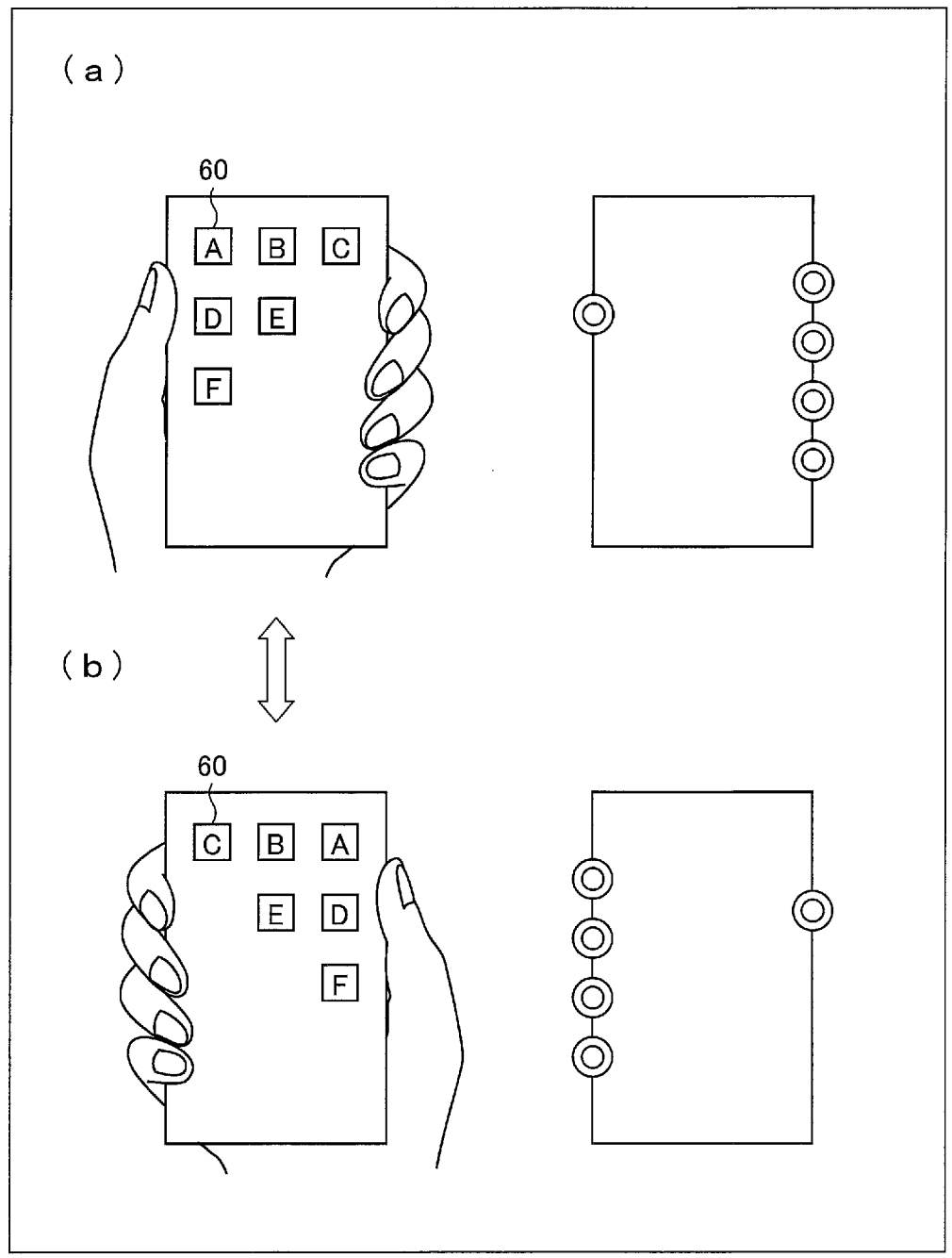

FIG. 22 shows diagrams each illustrating an example relationship between (i) an input operation at an outer edge of the display devices and (ii) a function to be performed, where (a) illustrates an example image displayed in the case where the user is holding the display device in the left hand, and (b) illustrates an example image displayed in the case where the user is holding the display device in the right hand.

Figure 23:
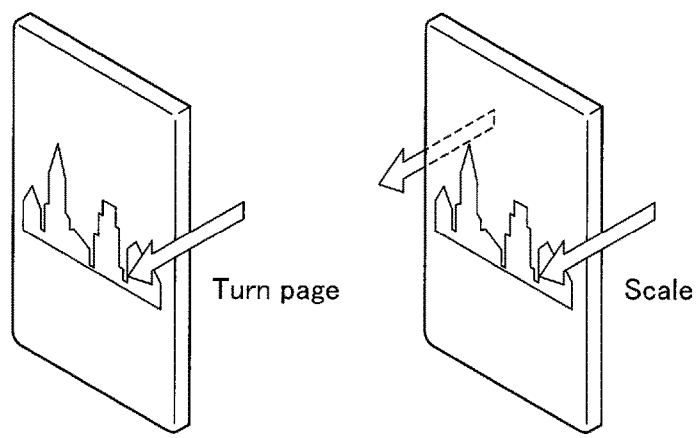

FIG. 23 shows diagrams each illustrating an example relationship between (i) an input operation at an outer edge of the display devices and (ii) a function to be performed.

Figure 24:
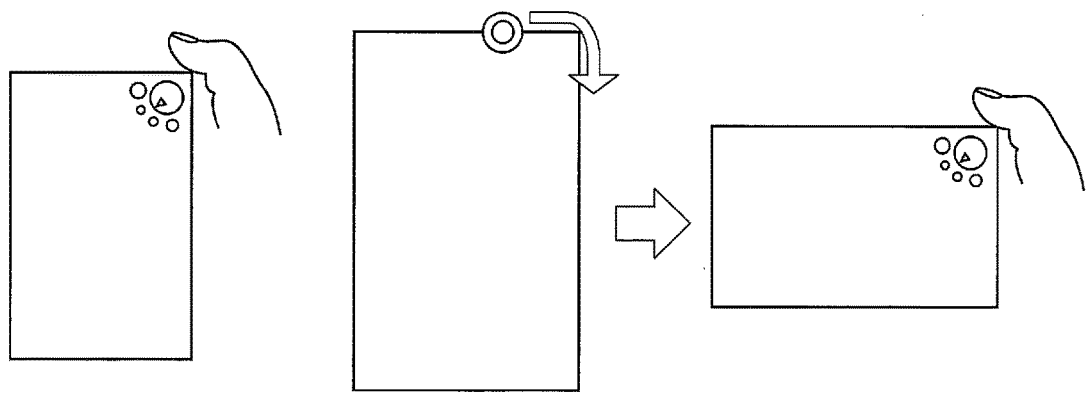

FIG. 24 shows diagrams each illustrating an example relationship between (i) an input operation at an outer edge of the display devices and (ii) a function to be performed.

Figure 25:
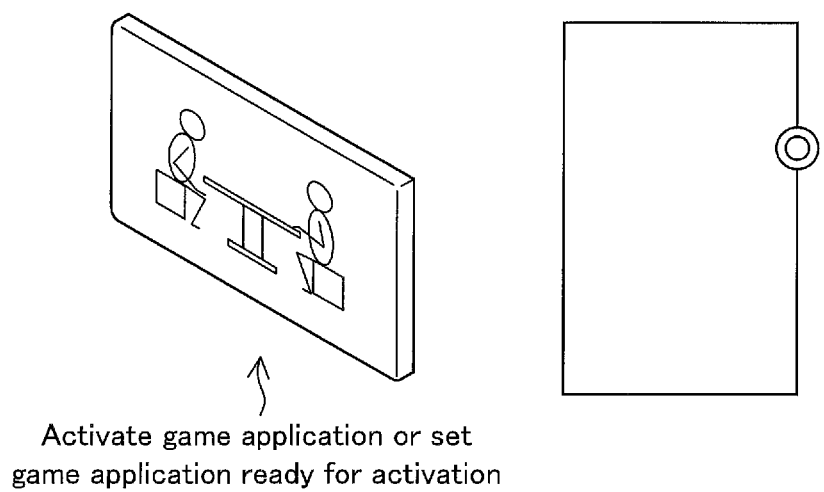

FIG. 25 shows diagrams each illustrating an example relationship between (i) an input operation at an outer edge of the display devices and (ii) a function to be performed.

Figure 26:
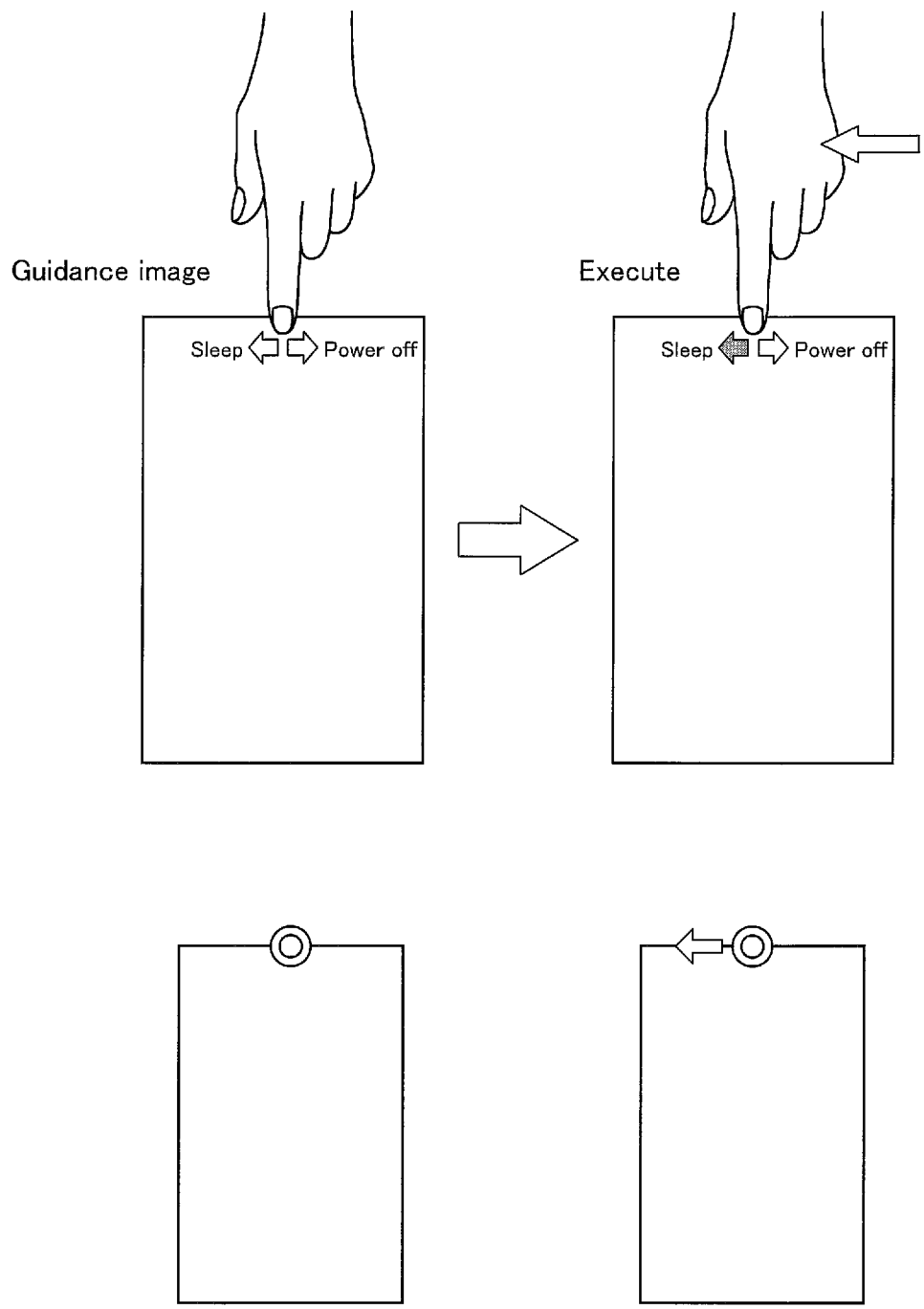

FIG. 26 shows diagrams each illustrating an example relationship between (i) an input operation at an outer edge of the display devices and (ii) a function to be performed.

Figure 27:
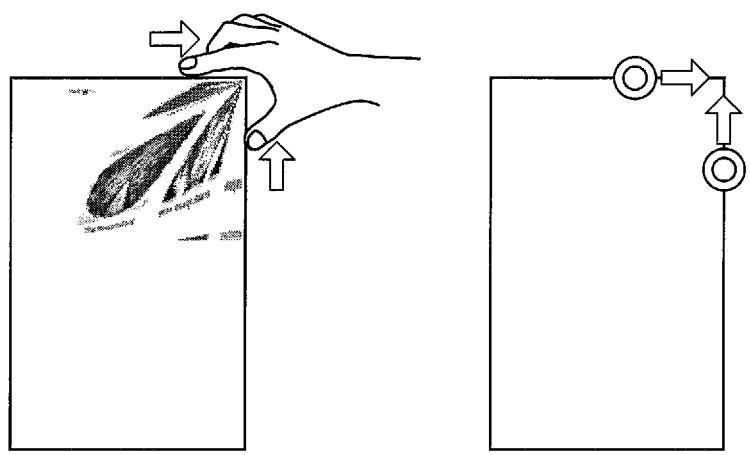

FIG. 27 shows diagrams each illustrating an example relationship between (i) an input operation at an outer edge of the display devices and (ii) a function to be performed.

Figure 28:
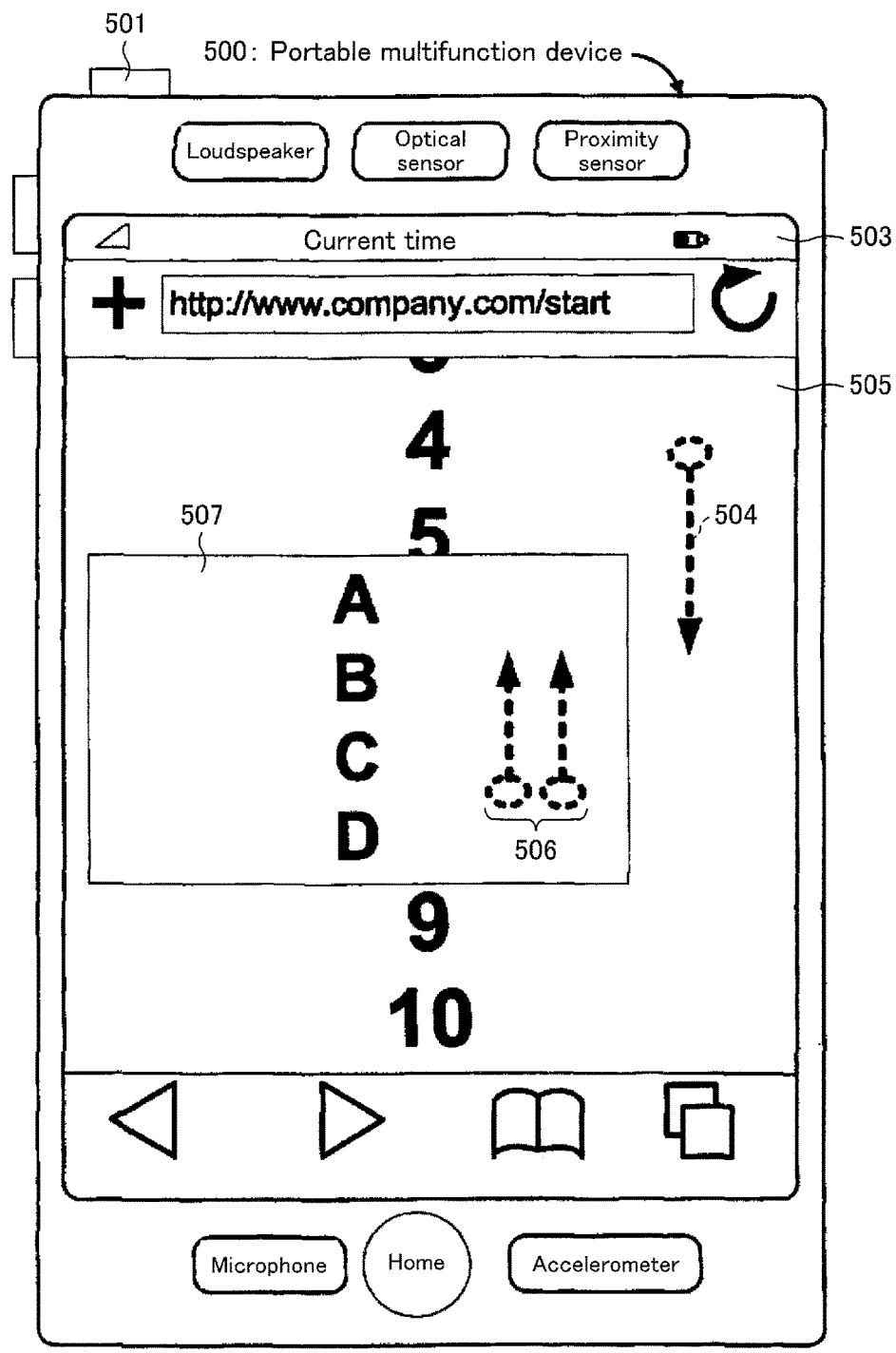

FIG. 28 is a diagram illustrating an example conventional portable multifunction device.

DESCRIPTION OF EMBODIMENTS

An embodiment of the present invention is described below with reference to FIGS. 1 through 27.

[Main Arrangements of Display Device 1 and Others]

The description below first deals with respective main arrangements of display devices 1 to 4 and 4a with reference to FIGS. 2 through 7. The description below assumes that the display devices 1 to 4 and 4a are each a liquid crystal display. The present invention is, however, not limited to such an arrangement: The display devices 1 to 4 and 4a may each be such a display device as a plasma display, an organic EL display, or a field emission display. The description below further assumes, unless otherwise stated, that the display devices 1 to 4 and 4a are each a plate-shaped member having a rectangular upper surface. The present invention is, however, not limited to such an arrangement: The display devices 1 to 4 and 4a may each have, for example, an elliptic or circular upper surface, or may each be not a plate-shaped member but a member having projections and depressions on a surface thereof. In other words, the display devices 1 to 4 and 4a may each have any shape as long as the display devices 1 to 4 and 4a are arranged to be capable of performing functions described below.

<Display Device 1 (Portable Terminal)>

Figure 2:
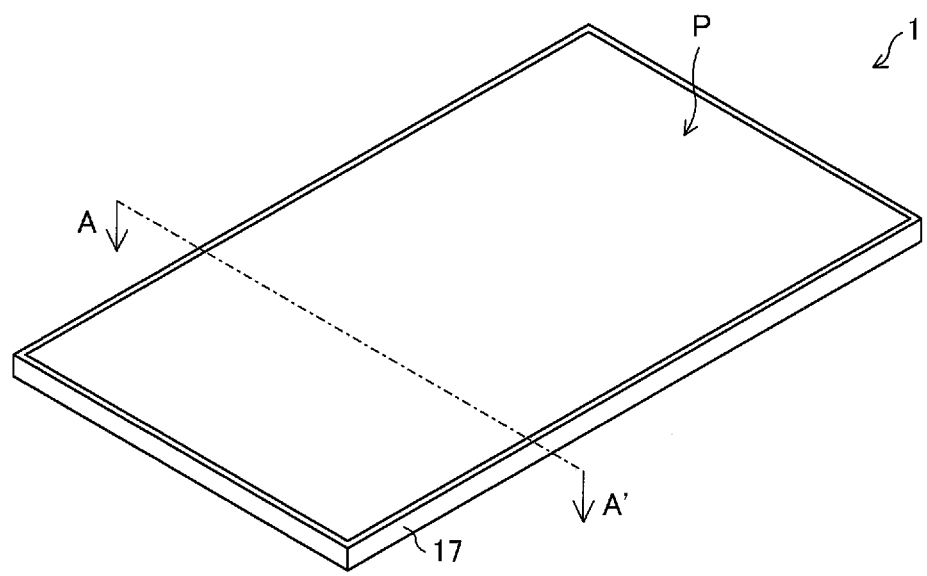
FIG. 2 is a perspective view of a portable terminal including the display device illustrated in (a) of FIG. 1, the perspective view schematically illustrating an example configuration of the portable terminal.
Figure 3:
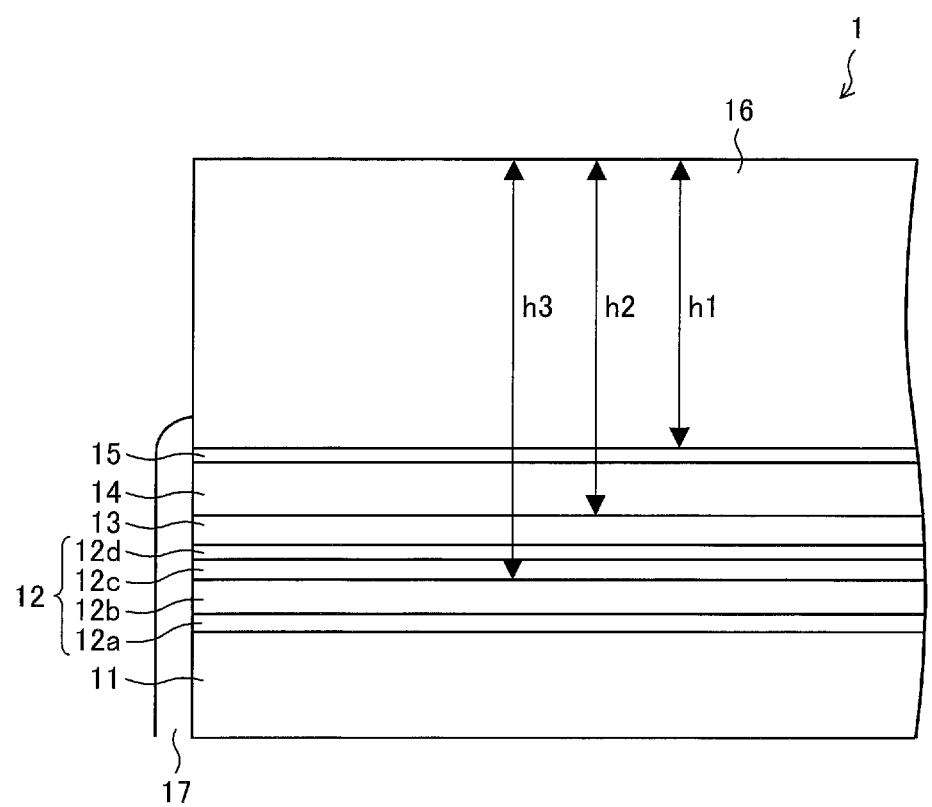
FIG. 3 is a cross-sectional view of the display device illustrated in (a) of FIG. 1, the cross-sectional view schematically illustrating an example configuration of the display device.

With reference to FIGS. 2 and 3, the description below deals with a case in which the display device 1 is included in a portable terminal (or the display device 1 functions as a portable terminal). FIG. 2 is a perspective view of a portable terminal including the display device 1, the perspective view schematically illustrating an example configuration of the portable terminal. FIG. 3 is a cross-sectional view of the display device 1 illustrated in FIG. 2, the cross-sectional view being taken along line A-A' and schematically illustrating an example configuration of the display device 1.

The display device 1 as a portable terminal displays an image, and is capable of accepting an input operation on an image. As illustrated in FIG. 2, the display device 1 has a shape defined by a casing 17 and displays an image in a display region P of a display screen (display panel 12).

More specifically, the display device 1, as illustrated in FIG. 3, includes a backlight 11, and further includes on the backlight 11 a display panel 12, a transparent adhesive layer (optical clear adhesive; OCA) 13, a touch panel 14 (operation detecting member), a transparent adhesive layer 15, and a cover glass 16 stacked on one another in that order. These members are supported by the casing 17 of the display device 1. In other words, the casing 17 contains the display panel 12 and the touch panel 14.

The display panel 12 can be a known display panel. The display panel 12 includes, for example, (i) an insulating active matrix substrate (not shown) made of a material such as glass, (ii) a light-transmitting counter substrate (not shown) made of a material such as glass and facing the active matrix substrate as separated therefrom by a predetermined distance, and (iii) a liquid crystal layer sandwiched between the active matrix substrate and the counter substrate. The liquid crystal layer can be any of various types of liquid crystal layers. The example of FIG. 3 includes (i) a TFT layer 12b having thin film transistors (TFTs) and (ii) two polarizing plates 12a and 12d sandwiching the TFT layer 12b. This allows a tone display of an image. The display panel 12 further includes a color filter 12c on the counter substrate side. This allows a color display.

The display panel 12 includes (i) data signal lines extending in a column direction, (ii) scanning signal lines and capacitor lines both extending in a row direction, and (iii) pixels arranged in a matrix on the row and column directions. The data signal lines and scanning signal lines are provided on the active matrix substrate.

The pixels are identical to one another in structure: Each pixel corresponds to at least one pixel electrode, a single data signal line, a single scanning signal line, and a single capacitor line. The pixels are each so configured that on the active matrix substrate, the pixel electrode is connected to the corresponding data signal line via a thin film transistor included in the TFT layer 12b and connected to the corresponding scanning signal line. The pixel electrode, together with a counter electrode provided on the counter substrate, forms a liquid crystal capacitor between the counter electrode and itself.

The thin film transistor for each pixel has a source electrode connected to the pixel electrode, a drain electrode connected to the data signal line, and a gate electrode connected to the scanning signal line. This configuration allows (i) the transistor to be controlled to turn on and off in response to a scanning signal (gate signal) supplied from the scanning signal line, (ii) a voltage corresponding to a data signal supplied to the data signal line to be applied to the liquid crystal layer, and (iii) that voltage to be retained while the transistor is off.

The display panel 12 is controlled by various driving circuits and a display control circuit (not shown) included in the display device 1. Such various driving circuits include, for example, a data signal line driving circuit and a scanning signal line driving circuit. Controlling the display panel 12 with use of the above circuits allows an image to be displayed on the display screen P.

More specifically, the display control circuit, upon detection of image display timing on the basis of a timing control signal supplied from a timing controller, generates, on the basis of display data and a sync signal both inputted from outside, a display control signal for causing an image (video) to be displayed by the display panel 12. The display control circuit then supplies the display control signal generated to various driving circuits to control their respective operations.

The scanning signal line driving circuit supplies scanning signals (gate signals) sequentially to the scanning signal lines on the basis of the display control signal outputted from the display control circuit. This operation turns on any transistor whose gate electrode corresponds to a portion of a scanning signal line that has been supplied with a scanning signal.

The data signal line driving circuit supplies data signals to the data signal lines on the basis of the display control signal. This operation causes voltages corresponding to the data signals to be applied to the liquid crystal layer via any transistor in the on state, so that image information is written into the liquid crystal layer.

The backlight 11 emits display light into the display panel 12. The backlight 11 may be external to the display device 1.

The touch panel 14 overlaps the display panel 12, and is a member for at least detecting (i) contact of a target object such as a finger (or thumb [the same applies hereinafter]) of the user's and a stylus pen with the display region P of the display panel 12 or (ii) approach of the target object to the display region P. The touch panel 14 thus accepts an input operation performed by the user on an image displayed in the display region P and makes it possible to control execution of predetermined functions (various applications) on the basis of input operations.

The touch panel 14 of the present embodiment is, for example, a capacitive touch panel.

The display panel 12 and the touch panel 14 are separated from each other by a transparent adhesive layer 13, with which the display panel 12 and the touch panel 14 are fixed. The transparent adhesive layer 13 may be replaced with an air layer (air gap). This arrangement, however, increases reflection at the interface between the transparent adhesive layer 13 and the touch panel 14. Thus, in the case where the display device 1 is used in an environment with external light, the display device 1 may suffer from such disadvantages as a decrease in the contrast of the displayed image. Using a transparent adhesive layer 13 as in the present embodiment can improve the optical properties of the display device 1. Using a transparent adhesive layer 13 can further improve controllability over the respective thicknesses (gaps) of the individual layers. The display device 1 of the present embodiment, therefore, preferably includes a transparent adhesive layer 13.

Later descriptions will deal with (i) how the touch panel 14 is arranged, (ii) example input operations, and (iii) the control of execution of predetermined functions on the basis of input operations.

The transparent adhesive layer 15 is provided between the touch panel 14 and the cover glass 16, and fixes the touch panel 14 and the cover glass 16.

The cover glass 16 is a transparent plate-shaped member so provided as to cover the touch panel 14 to protect the touch panel 14 from the outside. The cover glass 16 of the present embodiment is rectangular in shape. The present invention is, however, not limited to such an arrangement: The cover glass 16 may have a cutout shape at an end (outer edge). This arrangement can reduce the distance from the outer edge of the cover glass 16 to an outer edge electrode group of the touch panel 14, that is, an electrode group of detection electrodes 31a and drive electrodes 32a (see FIG. 1). The above arrangement can thus increase the detection accuracy at an outer edge of the display device 1, that is, an outside surface A of the display device 1 which outside surface A is separate from the display region P (see FIG. 1).

The casing 17, as mentioned above, contains the display panel 12 and the touch panel 14. The casing 17 includes a material having a large dielectric constant. This "material having a large dielectric constant" refers to a material having a dielectric constant that allows the touch panel 14 to easily detect contact of a finger or the like with the outer edge of the display device 1 or approach thereof to the outer edge.

Specifically, the casing 17 is made of the same glass as the cover glass 16 with a relative permittivity of approximately 6. (The touch panel 14 is also made of the same glass. In the case of a display device 2 described below, the casing 17 is made of the glass of which a lens 18 is made.) The material of the casing 17 is, however, not limited to that, and may be another resin having a relative permittivity of approximately 3. The casing 17 is, in other words, preferably made of a material having a relative permittivity that facilitates the above detection, that is, a relative permittivity of 3 or more (preferably 6 or more).

Using such a material having a large dielectric constant for the casing 17 can increase the detection accuracy at the outer edge of the display device 1.

In the case where the display device 1 is used as a portable terminal, the individual members included in the display device 1 have, as examples, respective thicknesses specified below.

The backlight 11 has a thickness of 0.74 mm. The polarizing plate 12a has a thickness of 0.15 mm. The TFT layer 12b has a thickness of 0.25 mm. The color filter 12c has a thickness of 0.15 mm. The polarizing plate 12d has a thickness of 0.11 mm. The transparent adhesive layer 13 has a thickness of 0.2 mm. The touch panel 14 has a thickness of 0.4 mm. The transparent adhesive layer 15 has a thickness of 0.1 mm. The cover glass 16 has a thickness h1 of 2 mm. Further, the cover glass 16 has a front surface separated from the interface between the touch panel 14 and the transparent adhesive layer 13 by a distance (thickness) h2 of 2.5 mm. The front surface of the cover glass 16 is separated from the interface between the color filter 12c and the TFT layer 12b by a distance (thickness) h3 of 2.96 mm.

The above thicknesses are, of course, mere examples, and vary as appropriate according to, for example, the size of a portable terminal to include the display device 1: For example, the display panel 12 has a thickness of 0.86 mm, which may alternatively be approximately 0.7 mm. The touch panel 14 may also have a thickness of approximately 0.7 mm. The casing 17 has a length (width) along a horizontal direction which length is, as described below, not larger than a length that allows the touch panel 14 to detect (i) contact of a finger or the like with an outside surface (end surface) of the casing 17 or (ii) approach thereof to the outside surface.

The display device 1 is used for such portable terminals as multifunction mobile telephones (smart phones) and tablet computers.

<Display Device 2 (Portable Terminal)>

Figure 4:
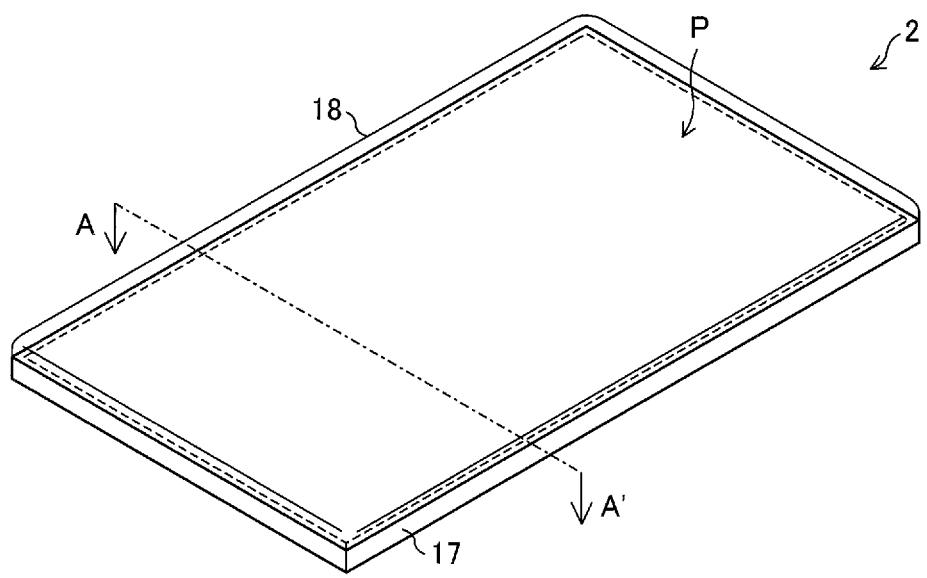
FIG. 4 is a perspective view of a portable terminal including the display device illustrated in (b) of FIG. 1, the perspective view schematically illustrating an example configuration of the portable terminal.
Figure 5:
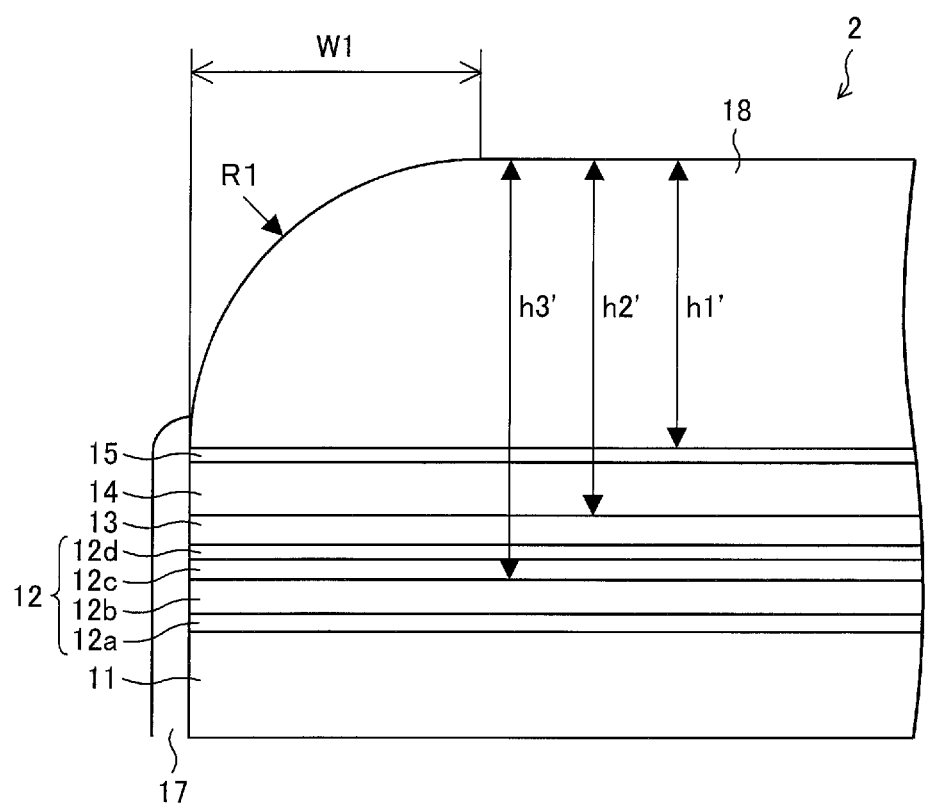
FIG. 5 is a cross-sectional view of the display device illustrated in (b) of FIG. 1, the cross-sectional view schematically illustrating an example configuration of the display device.

With reference to FIGS. 4 and 5, the description below deals with a variation of the portable terminal which variation includes a display device 2. FIG. 4 is a perspective view of a portable terminal including a display device 2 which portable terminal is a variation of the portable terminal illustrated in FIG. 2, the perspective view schematically illustrating an example configuration of the portable terminal including the display device 2. FIG. 5 is a cross-sectional view of the display device 2 illustrated in FIG. 4, the cross-sectional view being taken along line A-A' and schematically illustrating an example configuration of the display device 2.

As illustrated in FIGS. 4 and 5, the display device 2 is different from the display device 1 in that it includes a lens 18 instead of a cover glass 16, but is identical to the display device 1 in terms of the functions of the other members such as the display panel 12 and the touch panel 14. The description below thus mainly deals with how the display device 2 differs from the display device 1, and omits other points.

The display device 2, as illustrated in FIG. 5, includes a lens 18 above the touch panel 14. The lens 18 is a transparent plate-shaped member so provided as to cover the touch panel 14 to protect the touch panel 14 from the outside. The lens 18 has a cutout portion R1 (cutout shape) at an end (outer edge) to change the direction of travel of light emitted from the display panel 12.

Using a lens 18 having a cutout portion R1 can increase the detection accuracy of the touch panel 14 at the outer edge of the display device 2 as with the cover glass 16. Further, the cutout portion R1 changes the direction of travel of light emitted from pixels on an outer edge of the display panel 12 to allow such light to be emitted from a region (non-display region) located outside of the above pixels. The cutout portion R1 can thus increase the viewing angle of a display image (that is, a display region as viewed by the user). The lens 18 does not necessarily have a cutout portion R1 in the case where the function of increasing the viewing angle is unnecessary.

In the case where the display device 2 is used as a portable terminal, the individual members included in the display device 2 (other than the lens 18, which corresponds to the cover glass 16) have, as examples, respective thicknesses equal to those of the respective corresponding members of the display device 1. The lens 18 has a thickness h1' of 2.13 mm. The lens 18 has a front surface separated from the interface between the touch panel 14 and the transparent adhesive layer 13 by a distance (thickness) h2' of 2.63 mm. The front surface of the lens 18 is separated from the interface between the color filter 12c and the TFT layer 12b by a distance (thickness) h3' of 3.09 mm. Further, the cutout portion R1 has a width w1 of 2.1 mm. As with the display device 1, the above thicknesses are, of course, mere examples, and vary as appropriate according to, for example, the size of a portable terminal to include the display device 2.

<Display Device 3 (Television)>

Figure 6:
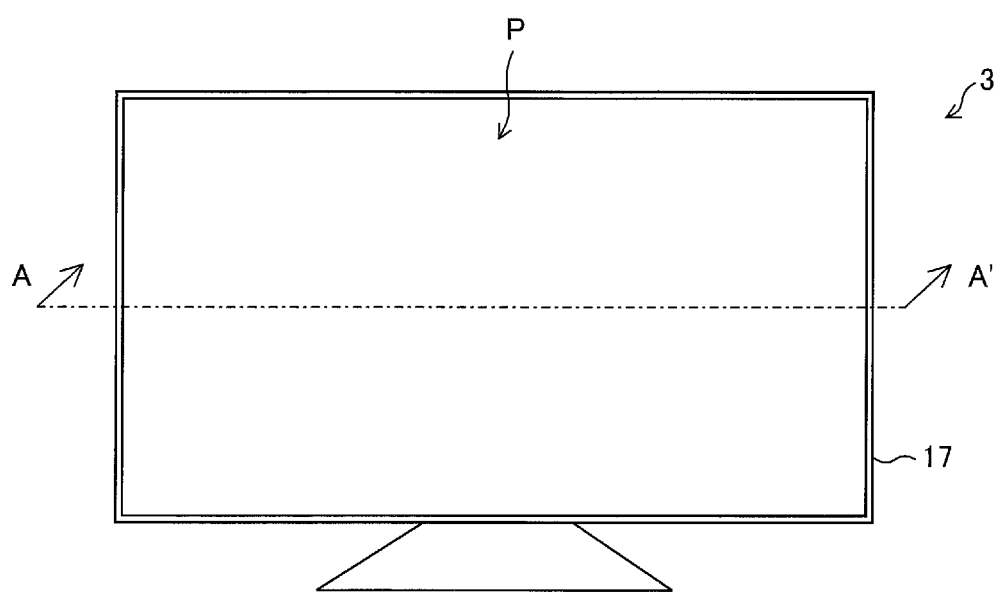
FIG. 6 is a perspective view of a television including the display device illustrated in (a) or (b) of FIG. 1, the perspective view schematically illustrating an example configuration of the television.

With reference to FIGS. 6 and 7, the description below deals with a television including a display device 3. FIG. 6 is a perspective view of a television including a display device 3, the perspective view schematically illustrating an example configuration of the television. FIG. 7 shows cross-sectional views of the display device 3 illustrated in FIG. 6, the cross-sectional views each being taken along line A-A' and schematically illustrating an example configuration of the display device 3.

The description below deals with an arrangement in which the display device 3 is included in a television. The display device 3 is, however, not necessarily included in a television: The display device 3 may be included in a monitor.

The display device 3 is identical in function to the display device 2 except that it functions as a television as illustrated in FIG. 6. Detailed descriptions of the individual members of the display device 3 are thus omitted here.

The casing 17, as illustrated in (a) and (b) of FIG. 7, has a protrusion 17a to retain the transparent adhesive layer 15. As with the display devices 1 and 2, the display device 3 illustrated in (a) and (b) of FIG. 7 includes, inside the touch panel 14 and on the transparent adhesive layer 15 side, a substrate 21 on which transparent electrodes (detection electrodes 31 and drive electrodes 32) are provided.

In the case where the display device 3 is used as a television as illustrated in (a) and (b) of FIG. 7, the individual members included in the display device 3 have, as examples, respective thicknesses specified below. The display panel 12, the transparent adhesive layer 13, and the touch panel 14 have respective thicknesses equal to those for the display devices 1 and 2.

In the case where the display device 3 is arranged as illustrated in (a) of FIG. 7 (completely frameless; the lens 18 overlapping with the casing 17), (i) the protrusion 17a of the casing 17 has a thickness h5 of 1.10 mm, (ii) the lens 18 has a thickness h6 of 22.62 mm, and (iii) a combination of the lens 18 and the transparent adhesive layer 15 has a thickness h7 of 23.52 mm (in other words, the transparent adhesive layer 15 has a thickness of 0.9 mm). Further, in the above case, (i) the casing 17 has a width (frame thickness) w2 of 2.00 mm, (ii) the protrusion 17a has a width w3 of 8.25 mm, (iii) the end surface (outside surface) of the casing 17 is separated from the display region P by a distance (length) w4 of 8.50 mm, and (iv) the cutout portion R1 has a width w5 of 16.80 mm.

In the case where the display device 3 is arranged as illustrated in (b) of FIG. 7 (with a frame; the casing 17 adjoining a side surface of the lens 18), (i) the protrusion 17a of the casing 17 has a thickness h9 of 1.10 mm, (ii) the lens 18 has a thickness h10 of 19.16 mm, and (iii) a combination of the lens 18 and the transparent adhesive layer 15 has a thickness h11 of 20.06 mm (in other words, the transparent adhesive layer 15 has a thickness of 0.9 mm). Further, in the above case, (i) the casing 17 has a width w6 of 2.00 mm, (ii) the protrusion 17a has a width w7 of 6.25 mm, (iii) the inside surface of the casing 17 is separated from the display region P by a distance (length) w8 of 6.50 mm, (iv) the outside surface of the casing 17 is separated from the display region P by a distance (length) w9 of 8.50 mm, and (v) the cutout portion R1 has a width w10 of 13.64 mm.

As with the display devices 1 and 2, the above thicknesses are, of course, mere examples, and vary as appropriate according to, for example, the size of a portable terminal to include the display device 3. For example, the lengths w5 and w10 each simply need to be approximately 5 to 10 mm.

The display devices 1 to 3 are each used not only for a portable terminal, a television, and a monitor, but also widely for any device capable of displaying an image and accepting an input operation on the image. Further, the lens 18 is not an essential member of the display device 3, and may be replaced with a cover glass 16.

[Detailed Configurations of Display Device 1 and Others]

Figure 1:
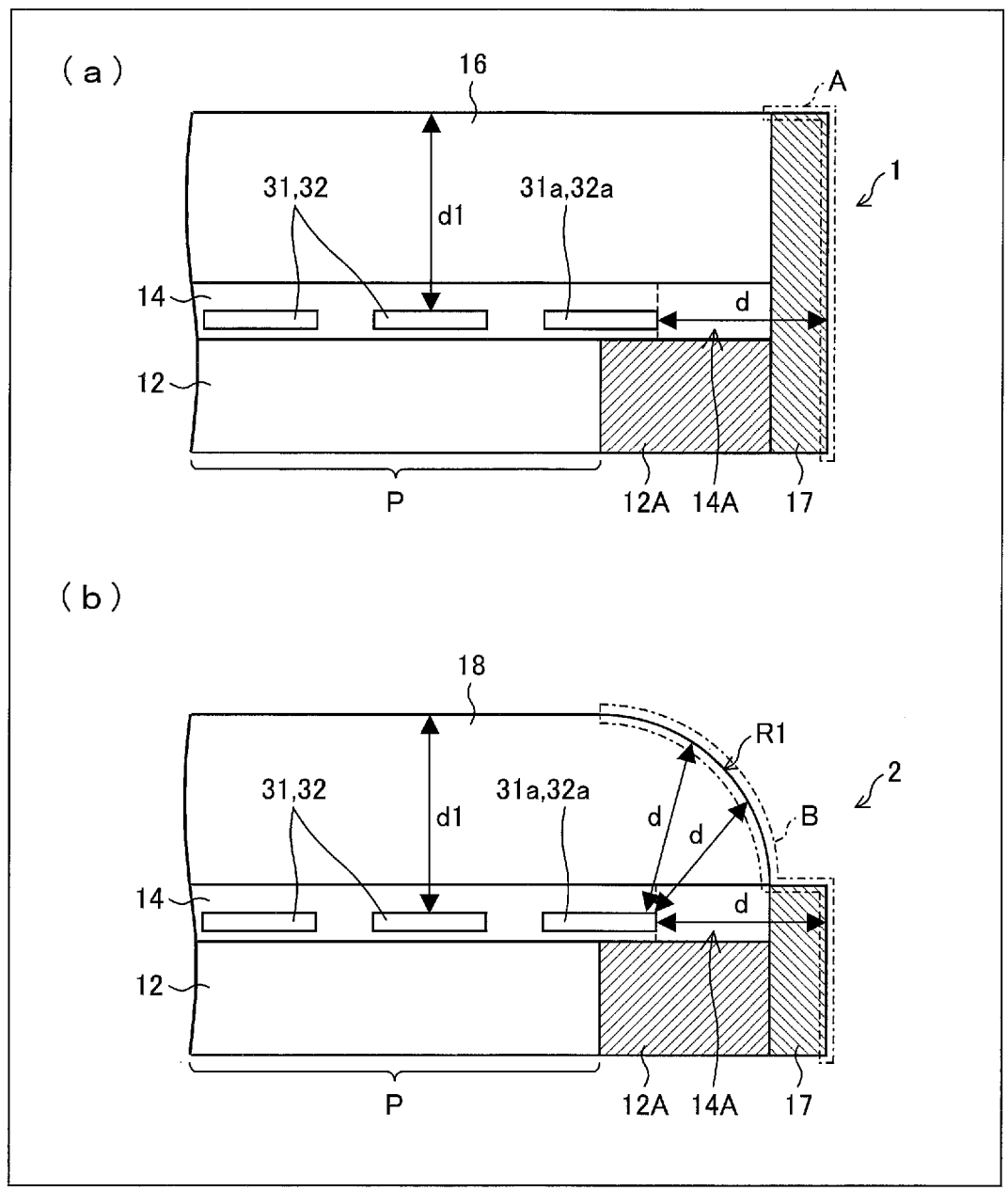
FIG. 1 shows cross-sectional views of a display device of an embodiment of the present invention, the cross-sectional views each schematically illustrating an example configuration of the display device, where (a) schematically illustrates a configuration with a cover glass, and (b) schematically illustrating a configuration with a lens.

The description below deals with detailed configurations of the display device 1 and others with reference to FIG. 1. FIG. 1 shows cross-sectional views of, for example, a display device 1 of an embodiment of the present invention, the cross-sectional views schematically illustrating example configurations of, for example, the display device 1, where (a) schematically illustrates a configuration of a display device 1 including a cover glass 16, and (b) schematically illustrates a configuration of a display device 2 including a lens 18. Since the display device 3 is identical to the display device 2 in configuration other than the size, the description below does not deal with a case in which the display device 3 is used.

<Display Device 1 (Portable Terminal)>

The description below first deals with a main configuration of the display device 1 with reference to (a) of FIG. 1. For simple descriptions, (a) of FIG. 1 omits illustrations of members such as the transparent adhesive layer 15 illustrated in FIG. 3.

The touch panel 14 includes, on a substrate, a detection electrode(s) 31 and a drive electrode(s) 32 as an electrode group for detecting contact or approach of a finger or the like. The electrode group includes a detection electrode(s) 31a and a drive electrode(s) 32a as an outer edge electrode group which are provided along an outer edge of the touch panel 14 (that is, the above substrate).

As illustrated in (a) of FIG. 1, the display device 1 includes, (i) between the display panel 12 and the inside surface of the casing 17, a first wire containing section 12A capable of containing various wires of the display panel 12 and (ii) between the touch panel 14 and the casing 17, a second wire containing section 14A for containing various wires of the touch panel 14.

The display device 1 of the present embodiment is arranged such that the minimum distance d between the touch panel 14 and an outside surface A of the casing 17 (that is, an end surface of the casing 17) which outside surface A is separate from the display region P is not larger than a detectable distance, within which the touch panel 14 is capable of detecting (i) contact of a finger or the like with the outside surface A or (ii) approach thereof to the outside surface A. This configuration allows the touch panel 14 to detect (i) contact of a finger or the like with the outside surface A of the casing 17, the outside surface A being separate from the display region P, or (ii) approach thereof to the outside surface A. With the above configuration, the display device 1 does not necessarily detect contact of a finger or the like or approach thereof over an image displayed by the display panel 12. The display device 1 can therefore, without decreasing the viewability or operability of the image, accept an operation performed with a finger or the like.

The above arrangement allows the touch panel 14, which detects contact of a finger or the like with the display region P or approach thereof to the display region P, to detect (i) contact of a finger or the like with the outside surface A or (ii) approach thereof to the outside surface A. The above arrangement thus eliminates the need to additionally include a member (that is, a dedicated sensor) for detecting contact of a finger or the like with the outside surface A or approach thereof to the outside surface A. The above arrangement consequently makes it possible to detect (i) contact of a finger or the like with the outside surface A or (ii) approach thereof to the outside surface A without increasing the number of components of the display device 1 (that is, without complicating the detecting mechanism).

The minimum distance d corresponds, as illustrated in (a) of FIG. 1, to a first distance, which is specifically a distance between (i) the detection electrodes 31a and drive electrodes 32a as an outer edge electrode group provided on the touch panel 14 and (ii) the outside surface A. The first distance (minimum distance d) is preferably not larger than a second distance d1, which is a distance in a direction perpendicular to the display panel 12 between (i) the touch panel 14 (specifically, the detection electrodes 31 and drive electrodes 32) and (ii) an outside surface of the cover glass 16 (that is, an upper surface of the display device 1 with which surface a finger [or thumb] or the like comes into contact). This arrangement allows the touch panel 14 to reliably detect (i) contact of a finger or the like with the outside surface A of the casing 17 or (ii) approach thereof to the outside surface A.

The display device 1 is, in other words, designed so that the minimum distance d is defined to allow the touch panel 14 to detect (i) contact of a finger or the like with the outside surface A of the casing 17 or (ii) approach thereof to the outside surface A, and is thus designed to have a narrow frame (or to be frameless). This allows the touch panel 14 to sense (i) contact of a finger or the like with the outside surface A (that is, the outer edge [terminal edge] of the display device 1) or (ii) approach thereof to the outside surface A. Further, narrowing the frame can also improve the design of the display device 1.

The minimum distance d simply needs to be not larger than the detectable distance at least at an end surface of the casing 17, which end surface is a portion of the outside surface A of the casing 17. This arrangement allows the touch panel 14 to detect (i) contact of a finger or the like with at least such an end surface or (ii) approach thereof to at least such an end surface.

<Display Device 2 (Portable Terminal)>

The description below now deals with a main configuration of the display device 2 with reference to (b) of FIG. 1. For simple descriptions, (b) of FIG. 1 omits illustrations of members such as the transparent adhesive layer 15 illustrated in FIG. 5. The display device 2, as described above, differs from the display device 1 in that it includes a lens 18 instead of a cover glass 16.

The display device 2 is so designed that the minimum distance d between the touch panel 14 and an outside surface B of the casing 17 (that is, an end surface of the casing 17) which outside surface B is separate from the display region P is not larger than a detectable distance, within which the touch panel 14 is capable of detecting (i) contact of a finger or the like with the outside surface B or (ii) approach thereof to the outside surface B. This configuration, as with the configuration of the display device 1, allows the touch panel 14 to detect (i) contact of a finger or the like with the outside surface B of the casing 17, the outside surface B being separate from the display region P, or (ii) approach thereof to the outside surface B.

The outside surface B covers not only an outside surface of the casing 17 which outside surface corresponds to the outside surface A illustrated in (a) of FIG. 1, but also an outside surface of the cutout portion R1 of the lens 18. The present embodiment, in other words, defines the outside surface B of the casing 17 as covering the above two outside surfaces.

The minimum distance d (first distance) for the display device 2 is, as illustrated in (b) of FIG. 1, a distance between (i) the detection electrodes 31a and drive electrodes 32a as an outer edge electrode group provided on the touch panel 14 and (ii) the outside surface B. As with the display device 1, the minimum distance d is preferably not larger than the second distance d1, and simply needs to be not larger than the detectable distance at least at an end surface of the casing 17, which end surface is a portion of the outside surface B of the casing 17.

<Structure of Touch Panel>

The description below deals with a detailed arrangement of the touch panel 14 with reference to FIGS. 8 through 12. FIG. 8 is a cross-sectional view of the touch panel 14 included in each of the display devices 1 to 3, the cross-sectional view schematically illustrating a configuration of the touch panel 14.

The display device 1 and others each include a display panel 12, a transparent adhesive layer 13, a touch panel 14, a transparent adhesive layer 15, and a cover glass 16 (or lens 18) as described above. Stated differently, these components achieve a touch panel function.

The touch panel 14 of the present embodiment can be any of various types of touch panels such as a so-called resistive (pressure-sensitive) touch panel and capacitive touch panel. The description below deals with a configuration in which a capacitive touch panel is included, in particular, a configuration in which an out-cell or on-cell touch panel is mounted on the outer side of the display panel 12. A capacitive touch panel detects a change in capacitance which change occurs in the case where a user has brought a finger, a stylus or the like into contact with a front surface of, for example, the display device 1 (specifically, a front surface of the cover glass 16 or lens 18, or the outside surface A or B), and thus detects the position of the contact. This arrangement makes it possible to detect the position of contact through a simple operation.

The touch panel 14 may not be an out-cell or on-cell touch panel, and may be an in-cell touch panel, which is incorporated in a cell of a display panel or the like. This structure achieves such advantages as (i) reduction in thickness and weight, (ii) improvement in viewability, and (iii) reduction in the number of components which reduction is achieved with the in-cell structure.

FIG. 9 shows diagrams each illustrating an example capacitive touch panel. (a) of FIG. 9 is a plan view of a touch panel, the plan view illustrating how electrodes of the touch panel are arranged. (b) of FIG. 9 is a cross-sectional view of the touch panel, the cross-sectional view being taken along line A-B shown in (a) of FIG. 9. (c) of FIG. 9 is a diagram illustrating an operation of the touch panel which operation is performed in the case where a finger (that is, a detection target object) has touched the touch panel.

FIG. 9 shows the reference numeral 21 to indicate a substrate made of a transparent insulator (dielectric), the substrate having a surface on which a plurality of detection electrodes 31 and a plurality of drive electrodes 32 are provided. The surface on which the detection electrodes 31 and drive electrodes 32 are provided is covered by a cover glass 16. The cover glass 16 is made of an insulator (for example, a transparent glass) having a predetermined dielectric constant.

Although (a) of FIG. 9 does not illustrate details of the connection, the drive electrodes 32 are connected to one another for each row in the X-axis direction, whereas the detection electrodes 31 are connected to one another for each column in the Y-axis direction. Applying a driving voltage to the drive electrodes 32 and detection electrodes 31 forms capacitances, as illustrated in (b) of FIG. 9, between the drive electrodes 32 and detection electrodes 31 through the substrate and cover glass 16 to form lines of electric force as illustrated.

A fingertip 94 touching the front surface of the cover glass 16 with a driving voltage applied as above forms a capacitance 95 between (i) ground and (ii) the drive electrodes 32 and detection electrodes 31 through the human body as illustrated in (c) of FIG. 9, thereby causing part of the lines of electric force to be grounded through the fingertip 94. This indicates a large change in capacitance between the drive electrodes 32 and detection electrodes 31 at a portion at which the fingertip 94 has touched the front surface. The touch panel 14 can detect such a change to detect the position at which the fingertip 94 has touched the front surface.

The present embodiment can use a known circuit (see, for example, Patent Literature 2) as a position detecting circuit for detecting the coordinate position of a detection target object. The position detecting circuit is not limited to any particular circuit.

FIG. 10 is a circuit diagram illustrating a position detecting circuit for a mutual capacitive touch panel (which is a mainstream capacitive touch panel) disclosed in Patent Literature 2. FIG. 11 is a timing chart illustrating an operation of the circuit.

The circuit includes a transmitting electrode (drive electrode) 100 and a receiving electrode (detection electrode) 104 connected to each other through a cross capacitor 105. The circuit further includes on the receiving electrode side a switch 401, a storage capacitor 402, a reset switch 404, and an output amplifier 403. The transmitting electrode 100 generates a rectangular waveform 109 with the aid of an amplifier 101. The circuit is first reset, allows electric charge to be transferred and held repeatedly, and then measures a voltage difference. Specifically, since the cross capacitor 105 changes depending on whether a finger is in contact with the touch panel (for example, placing a finger on the touch panel reduces the cross capacitor), measuring a difference in an output voltage 402 allows detection of a position at which a fingertip has touched the touch panel.

FIG. 12 is a top view of the touch panel 14 of the present embodiment, the top view schematically illustrating a configuration of the touch panel 14. The touch panel 14, as illustrated in FIG. 12, includes on the substrate 21 detection electrodes 31 and drive electrodes 32 arranged in a matrix as an electrode group for detecting contact of a finger or the like or approach thereof. The electrode group includes detection electrodes 31*a* and drive electrodes 32*a* as an outer edge electrode group which are provided along an outer edge of the touch panel 14 (that is, the substrate 21). The detection electrodes 31 and drive electrodes 32 (that is, the circuit illustrated in FIGS. 10 and 11) are controlled by a TP controller (touch panel controller) 33.

The display device 1 and others of the present embodiment are arranged to detect contact of a finger or the like with the outside surface A or B of the casing 17 or approach thereof to the outside surface A or B. The second wire containing section 14A of the touch panel 14 (that is, the frame wiring width w0 of the touch panel 14) is thus preferably not larger than 1 mm for the display devices 1 and 2 each used as a portable terminal.

The display device 2, which includes the lens 18, is preferably arranged such that the electrodes and second wire containing section 14A are so positioned as not to block the path of light emitted from the display panel 12.

(Detection in Depth Direction)

The description below deals with a method for detecting an input operation (described below) performed in a depth direction with reference to FIG. 13. (a) and (b) of FIG. 13 are each a diagram illustrating a method for detecting an input operation performed in the depth direction. For such detection of an input operation in the depth direction, the cover glass 16 and lens 18 each preferably have a cutout shape. The description below deals with a display device 2 including a lens 18 having a cutout portion R1.

An input operation performed in the depth direction of the display device 2 as illustrated in (a) of FIG. 13 specifically involves a fingertip 94 moving along at least the cutout portion R1 of the lens 18 (that is, a portion of the outside surface B) as illustrated in (b) of FIG. 13. In response, the TP controller 33 (see FIG. 12) (i) while the fingertip 94 is at different positions through which it is moved, receives signals (capacitances C1 and C2) from a detection electrode 31 and detection electrode 31*a* adjacent to each other and (ii) calculates differences (C1−C2) between those signals for detection of a move in the depth direction.

The calculation of differences, that is, control over reading of differentials between adjacent detection electrodes, may be performed with use of a known technique, for example, a technique disclosed in Patent Literature 3. Such a technique for use in the present invention is not described here in detail.

[Main Arrangements of Display Devices 4 and 4*a*]

With reference to FIG. 14, the description below deals with respective main arrangements of display devices 4 and 4*a* each according to a variation of an embodiment of the present invention. (a) of FIG. 14 is a perspective view of a display device 4, the perspective view schematically illustrating an example configuration of the display device 4.

As with the display devices 1 to 3, the display device 4 includes (although not shown in (a) of FIG. 14) (i) a display panel 12, (ii) a touch panel 14 (first operation detecting member) overlapping with the display panel 12 and configured to detect contact of a finger or the like with a display region P of the display panel 12 or approach thereof to the display region P, and (iii) a casing 17 containing the display panel 12 and the touch panel 14.

The display devices 1 to 3 are arranged such that the minimum distance d (see FIG. 1) is not larger than the detectable distance, within which the touch panel 14 is capable of detecting contact of a finger or the like with the outside surface A or B or approach thereof to the outside surface A or B, and eliminate the need to additionally include a member for detecting, for example, the contact with the outside surface A or B. The present invention is, however, not limited to such an arrangement. As with the display device 4 illustrated in (a) of FIG. 14, the touch panel 14 may be replaced with another member, that is, a touch panel 14*a* (second operation detecting member), to detect contact of a finger or the like with the outside surface A or B of the casing 17 or approach thereof to the outside surface A or B.

The display device 4 is, as described above, also arranged to detect (i) contact of a finger or the like with the outside surface A or B of the casing 17, the outside surface A or B being separate from the display region P, or (ii) approach thereof to the outside surface A or B. With the above configuration, the display device 4 does not necessarily detect contact of a finger or the like or approach thereof over an image displayed by the display panel 12. The display device 4 can therefore, without decreasing the viewability or operability of the image, accept an operation performed with use of a finger or the like.

The touch panel 14a illustrated in (a) of FIG. 14 includes detection electrodes 31 and drive electrodes 32 arranged alternately on a single line. The present invention is, however, not limited to such an arrangement. A touch panel alternative to the touch panel 14a may include electrodes on a plurality of lines, depending on the height of the end surface (side surface) of the casing 17, that is, the length of the casing 17 which length is in a direction perpendicular to the front surface of the cover glass 16 or lens 18 (that is, the upper surface of the display device 4).

The display device of the present invention may be arranged, for example, as the display device 4a illustrated in (b) of FIG. 14. (b) of FIG. 14 is a perspective view of a display device 4a, which is a variation of the display device 4, the perspective view schematically illustrating an example configuration of the display device 4a.

The display device 4a, as illustrated in (b) of FIG. 14, differs from the display device 4 in that it includes a touch panel 14b (second operation detecting member) instead of a touch panel 14a. The touch panel 14b is, as with the touch panel 14a, provided on an end surface (side surface) of the casing 17 and arranged to be capable of detecting contact of a finger or the like with the outside surface A or B of the casing 17 or approach thereof to the outside surface A or B. The touch panel 14b, however, differs from the touch panel 14a in how detection electrodes 31 and drive electrodes 32 are arranged. Specifically, the touch panel 14b is arranged such that two detection electrodes 31 are arranged in the height direction and that such pairs of detection electrodes 31 and drive electrodes 32 are arranged alternately.

Arranging two detection electrodes 31 on a line in the height direction as described above allows even the display device 4a, which includes a touch panel that covers a side surface of the display device 4a, to detect, as with the display devices 1 to 3, an input operation (described below) performed in the depth direction. In this case, the TP controller 33 (see FIG. 12) detects a change in capacitance between (i) two detection electrodes 31 arranged in the height direction and (ii) a drive electrode 32 to detect an input operation performed in the depth direction.

The touch panel 14b illustrated in (b) of FIG. 14 includes two detection electrodes 31 arranged in the height direction. The present invention is, however, not limited to such an arrangement. A touch panel alternative to the touch panel 14b may include three or more detection electrodes 31 arranged in the height direction. This arrangement makes it possible to more reliably detect an input operation performed in the depth direction. The touch panels 14a and 14b are each controlled in a manner similar to the manner in which the touch panel 14 is controlled. The control of the touch panels 14a and 14b is thus not described here in detail.

[Arrangement of Control Section 50]

With reference to FIG. 15, the description below deals with a main arrangement of a control section 50 included in each of the display devices 1 to 4 and 4a. FIG. 15 is a functional block diagram schematically illustrating an example configuration of the control section 50 included in the display device 1 and others. The description below specifically deals with a process performed by the control section 50 upon acceptance of an input operation on, for example, the display device 1, in particular, an input operation on an outer edge (outside surface A or B) of, for example, the display device 1.

The display device 1 and others, as illustrated in FIG. 15, each include a touch panel 14 (or a touch panel 14a or 14b), a display panel 12, and a control section 50 as main components. As the touch panel 14 and display panel 12 are described above, the description below deals with the control section 50. The description below deals with a mere example of the arrangement of the control section 50, and the arrangement of the control section 50 is not limited to that described below.

The control section 50 includes an operation accepting section 51, an input operation determining section 52, an execution control section 53, and a display control section 54 as main components. The control section 50, for example, executes control programs to control the members constituting, for example, the display device 1. The control section 50 (i) reads a program from a storage section 55 into a temporary memory section (not shown) including, for example, a random access memory (RAM) and (ii) executes that program to cause various processes to be performed, for example, to cause any of the members to perform a process.

The operation accepting section 51, for control of image display, accepts an input operation performed with a target object on the display region P or outer edge of, for example, the display device 1. The operation accepting section 51 allows, for example, the display device 1 to accept an input operation performed with a finger or the like on at least the outer edge of, for example, the display device 1 (that is, a region other than the display region P).

The operation accepting section 51 accepts an input operation by receiving a detection signal from the TP controller 33. Specifically, the TP controller 33 (i) detects, when there has occurred a change in capacitance, which detection electrode 31 or 31a that change has occurred at, and (ii) transmits the detection result to the operation accepting section 51 as a detection signal.

The input operation determining section 52 determines whether an input operation accepted by the operation accepting section 51 is based on (i) contact of a finger or the like with the display region P (see, for example, FIG. 2) or approach thereof to the display region P or on (ii) contact of a finger or the like with an outer edge of, for example, the display device 1 or approach thereof to the outer edge. The input operation determining section 52 performs the above determination by determining at which detection electrode 31 or 31a a change in capacitance has occurred to result in the detection signal accepted by the operation accepting section 51.

The execution control section 53 controls execution of predetermined functions in accordance with input operations accepted by the operation accepting section 51. Specifically, the execution control section 53 first identifies, (i) on the basis of the result of the determination by the input operation determining section 52, whether the input operation is on the outer edge of, for example, the display device 1 or on the display region P and further identifies (ii) what type of operation the input operation is (specifically, whether the input operation is, for example, a touching operation at a single position, a touching operation at a plurality of positions, or a slide operation). The execution control section 53 then control execution of a predetermined function (application) corresponding to the input operation.

The execution control section 53 may, (i) by identifying the input operation, further identify the manner in which the user is holding, for example, the display device 1 (that is, whether the user is holding, for example, the display device 1 in the right hand or left hand) and (ii) control execution of a predetermined function on the basis of the result of the identification. For instance, the execution control section 53 may, on the basis of the result of the identification, change the arrangement of icons (operation input images) each for performing a predetermined function (see what is indicated by the reference numeral 60 in FIG. 22).

The storage section 55 thus stores data (for example, a table) that associates each of various input operations with details of control of execution of a predetermined function corresponding to the input operation. The storage section 55 further stores, for example, data (for example, a table) that associates, with one another, (i) each predetermined input operation (that is, a combination described below of detection positions), (ii) a holding manner, and (iii) an icon arrangement.

The display control section 54 controls, for example, a data signal line driving circuit, a scanning signal line driving circuit, and a display control circuit to cause the display panel 12 to display an image under the control by the execution control section 53 of execution of a predetermined function.

The above arrangement makes it possible to (i) accept an input operation performed with a finger or the like on at least the outer edge of, for example, the display device 1 and (ii) control execution of a predetermined function corresponding to that input operation. The above arrangement thus allows (i) any of various functions to be performed under execution control in response to an input operation on the outer edge and (ii) an image corresponding to the performed function to be displayed as a result.

The storage section 55 further stores (1) programs for control of the individual sections, (2) an OS program, and (3) application programs, the programs (1) to (3) being executed by the control section 50, as well as (4) various data to be read for execution of the programs. The control section 50 includes a nonvolatile memory device such as a read only memory (ROM) or a flash memory. While the temporary memory section includes a volatile memory device such as a RAM, the description of the present embodiment may assume that the storage section 55 additionally has the function of the temporary memory section.

With reference to FIG. 16, the description below deals with an example process performed by, for example, the display device 1. FIG. 16 is a flowchart illustrating an example process performed by, for example, the display device 1.

First, in the case where the touch panel 14 has detected contact of a finger or the like or approach thereof, the operation accepting section 51 accepts an input operation based on that detection (S1). The input operation determining section 52 next determines whether the input operation is based on detection at the outer edge of, for example, the display device 1 (S2). The execution control section 53 then controls execution of a predetermined function in accordance with the result of the determination (S3). The display control section 54 controls the display panel 12 to cause it to display an image under the execution control.

[Example Input Operations Performed by User on Outer Edge of Display Device 1 and Others]

With reference to FIGS. 17 through 19, the description below deals with example input operations performed by a user on the outer edge (end surface) of, for example, the display device 1. FIG. 17 is a diagram illustrating an example image displayed in the case where a finger is in contact with the outer edge of, for example, the display device 1. (a) to (d) of FIG. 18 are each a diagram illustrating an example input operation performed in the case where a finger is in contact with a single position on the outer edge of, for example, the display device 1. (a) to (d) of FIG. 19 are each a diagram illustrating an example input operation performed in the case where fingers are in contact with a plurality of positions on the outer edge of, for example, the display device 1. FIGS. 18 and 19 show (i) double circles to each indicate a position of contact of a finger or the like or approach thereof and (ii) arrows to each indicate a movement of the finger or the like which movement occurs after the contact or approach.

The example of FIG. 17 shows that the display device 1 and others are each capable of displaying an image that follows an input operation based on detection of contact of a finger or the like or approach thereof. The display device 1 and others are, in this case, each capable of moving the image, displayed at the position at which the finger or the like is in contact with the outer edge of the display device 1 or the like, in synchronization with a movement of the finger or the like.

FIG. 18 shows specific example input operations. FIG. 18 indicates that the touch panel 14, 14a, or 14b of the display device 1 or the like has detected contact of a finger or the like or approach thereof at a single position on an end surface of the casing 17, which end surface is a portion of the outside surface A or B of the casing 17. Stated differently, FIG. 18 indicates that the operation accepting section 51 has accepted an input operation at a single position on the outer edge of, for example, the display device 1. This arrangement allows a single-position detection of a finger or the like on an end surface of the casing 17 and thus allows, for example, the display device 1 to perform a function in response to such a single-position detection.

More specifically, (a) of FIG. 18 illustrates a case in which a finger or the like is in contact with a single position on an end surface of the casing 17 (single-position touch). (b) of FIG. 18 illustrates a case in which a finger or the like, after coming into contact with a single position on an end surface of the casing 17, is moved (slid) along the outer edge of, for example, the display device 1. (c) of FIG. 18 illustrates a case in which a finger or the like, after coming into contact with a single position on an end surface of the casing 17, is moved along a corner of the outer edge of, for example, the display device 1. (d) of FIG. 18 illustrates a case in which a finger or the like, after coming into contact with a single position on an end surface of the casing 17, is moved in the depth direction of the outer edge (outside surface A or B) of, for example, the display device 1.

FIG. 19 illustrates cases in each of which fingers or the like have touched a plurality of positions on an end surface(s) of the casing 17. FIG. 19 indicates that the touch panel 14, 14a, or 14b of the display device 1 or the like has detected contact of fingers or the like or approach thereof at a plurality of positions on an end surface(s) of the casing 17, which end surface(s) is a portion of the outside surface A or B of the casing 17. Stated differently, FIG. 18 indicates that the operation accepting section 51 has accepted an input operation at a plurality of positions on the outer edge of, for example, the display device 1. This arrangement allows a multiple-position detection of fingers or the like on an end surface of the casing 17 and thus allows, for example, the display device 1 to perform a function in response to such a multiple-position detection. The above arrangement can further prevent an operation mistake (that is, contact or approach of a finger or the like which contact or approach does not intend to control execution of a predetermined function), which is a problem involved with detection of contact of a finger or the like or approach thereof on the outer edge of, for example, the display device 1.

More specifically, (a) of FIG. 19 illustrates a case in which fingers or the like, after coming into contact with two positions on an end surface of, for example, the display device 1 which end surface is a portion of the outer edge of, for example, the display device 1, are each moved along the end surface.

(b) of FIG. 19 illustrates a case in which fingers or the like, after coming into contact one-to-one with two end surfaces of, for example, the display device 1 which end surfaces are each a portion of the outer edge of, for example, the display device 1 and are adjacent to each other, are each moved to a corner formed by the two end surfaces. The movement is not limited to a movement to a corner. Further, fingers or the like may be in contact with three or more positions on two end surfaces adjacent to each other.

(c) of FIG. 19 illustrates a case in which fingers or the like, after coming into contact one-to-one with two end surfaces of, for example, the display device 1 which end surfaces are each a portion of the outer edge of, for example, the display device 1 and face each other, are each moved in the same direction. Fingers or the like at two positions are not necessarily moved in the same direction. Further, fingers or the like may be in contact with three or more positions on two end surfaces facing each other.

(d) of FIG. 19 illustrates a case in which (i) a finger or the like comes into contact with a single position on an end surface of, for example, the display device 1 which end surface is a portion of the outer edge of, for example, the display device 1 and (ii) other fingers or the like come into contact with four positions on another end surface facing the above end surface. This is a case in which the user is holding, for example, the display device 1 in one hand. The user may, for instance, be holding the display device 1 or the like at three end surfaces. In this case, (i) a finger or the like is in contact with a single position on a first end surface, (ii) another finger or the like is in contact with a single position on a second end surface, which is adjacent to the first end surface, and (iii) fingers or the like are in contact with three positions on a third end surface, which faces the first end surface. Further, a finger or the like in contact with a single position on an end surface (see (d) of FIG. 19) may be moved, for instance.

As described above, the examples illustrated in (b) to (d) of FIG. 18 and (a) to (c) of FIG. 19 are each arranged such that the touch panel 14, 14a, or 14b detects (i) contact of a finger or the like with an end surface(s) of the casing 17 in the surface direction or (ii) approach thereof to an end surface(s) of the casing 17 in the surface direction. Stated differently, the above examples are each arranged such that the input operation accepted by the operation accepting section 51 corresponds to a movement, in the surface direction, of a finger or the like relative to an end surface(s) of, for example, the display device 1 which end surface(s) is a portion of the outer edge of, for example, the display device 1. This arrangement allows the touch panel 14, 14a, or 14b to detect a movement of a finger or the like at an end surface(s) of the casing 17 and thus allows, for example, the display device 1 to perform a function in response to such a movement.

The examples illustrated in (c) of FIG. 18 and (b) of FIG. 19 are each arranged such that the touch panel 14, 14a, or 14b detects a movement of a finger or the like in a particular region (corner) covering (i) a joint between two adjacent end surfaces of the casing 17 and (ii) the vicinity thereof. Stated differently, the above examples are each arranged such that the input operation accepted by the operation accepting section 51 corresponds to a movement of a finger in a particular region (corner) covering (i) a joint between two adjacent end surfaces of, for example, the display device 1 which end surfaces are each a portion of the outer edge of, for example, the display device 1 and (ii) the vicinity thereof. This arrangement allows the touch panel 14, 14a, or 14b to detect a movement of a finger or the like in a particular region and thus allows, for example, the display device 1 to perform a function in response to a movement in the particular region.

The example illustrated in (c) of FIG. 18 is arranged such that the touch panel 14, 14a, or 14b detects (i) a movement, in the surface direction, of a finger or the like at an end surface of the casing 17 and (ii) a movement, in the surface direction, of another finger or the like at an opposite end surface facing the above end surface. Stated differently, the above example is arranged such that the input operation accepted by the operation accepting section 51 corresponds to (i) a movement, in the surface direction, of a finger or the like at an end surface of, for example, the display device 1 which end surface is a portion of the outer edge of, for example, the display device 1 and (ii) a movement, in the surface direction, of another finger or the like at an opposite end surface facing the above end surface. This arrangement allows the touch panel 14, 14a, or 14b to detect a movement of a finger or the like at an end surface and a movement of another finger or the like at the opposite end surface and thus allows, for example, the display device 1 to perform a function in response to movements of fingers or the like at a plurality of positions.

The example illustrated in (d) of FIG. 18 is arranged such that the touch panel 14 or 14b detects a movement of a finger or the like in a direction perpendicular to the display panel 12. Stated differently, the above example is arranged such that the input operation accepted by the operation accepting section 51 corresponds to a movement of a finger or the like in a direction perpendicular to the display panel 12 of, for example, the display device 1. This arrangement allows the touch panel 14 or 14b to detect a movement of a finger or the like in the perpendicular direction at the outside surface A or B and thus allows, for example, the display device 1 to perform a function in response to a movement in the perpendicular direction.

The example illustrated in (d) of FIG. 19 is arranged such that the touch panel 14, 14a, or 14b detects contact of a finger or the like or approach thereof at (i) a single position on an end surface of the casing 17 and (ii) a plurality of positions on another end surface of the casing 17. Stated differently, the above example is arranged such that the operation accepting section 51 accepts input operations at (i) a single position on an end surface of, for example, the display device 1 which end surface is a portion of the outer edge of, for example, the display device 1 and at (ii) a plurality of positions on an end surface other than the above end surface. This arrangement allows the touch panel 14, 14a, or 14b to detect contact of a finger or the like or approach thereof at a single position on an end surface and a plurality of positions on another end surface and thus allows, for example, the display device 1 to perform a function in response to such contact or approach.

As described above, the touch panel 14, 14*a*, or 14*b* allows, for example, the display device 1 to accept various input operations such as a finger(s) or the like sliding along an end surface, pinching a corner, and touching two opposite end surfaces (and moving along the end surfaces), and a hand holding, for example, the display device 1.

(Limit on Input Operation Accepting Region)

As described above, the display device 1 and others, each of which includes the touch panel 14, 14*a*, or 14*b*, are each capable of detecting (i) contact of a finger or the like with at least a portion of the outside surface A or B (that is, the outer edge of, for example, the display device 1) or (ii) approach thereof to at least a portion of the outside surface A or B, and are thus each capable of accepting an input operation based on such a detection. The display device 1 and others are each also capable of detecting, for example, contact of a finger or the like or approach thereof over the entire outside surface A or B.

The touch panel 14, 14*a*, or 14*b* is, in the above case, capable of detecting contact of a finger or the like or approach thereof over a wide range of the outside surface A or B. The touch panel 14, 14*a*, or 14*b* is thus capable of (i) combining various detection results and (ii) causing different functions to be performed each of which corresponds to such a combination. Allowing detection over such a wide range, however, increases the risk accordingly of recognizing accidental contact of a finger or the like or accidental approach thereof as an operation.

The display device 1 and others are, to reduce the risk of accidentally recognizing an operation, each preferably so set that the region in which the touch panel 14, 14*a*, or 14*b* is capable of detecting contact of a finger or the like or approach thereof can be limited to a first end surface of the casing 17 and a particular region covering (i) a joint between the first end surface and a second end surface adjacent to the first end surface and (ii) the vicinity of the joint. Stated differently, the display device 1 and others are each preferably so set that the operation accepting section 51 accepts an input operation in a region that can be limited to (i) an end surface of, for example, the display device 1 which end surface is a portion of the outer edge of, for example, the display device 1 and (ii) a particular region covering a joint between the above end surface and another end surface adjacent thereto and the vicinity of the joint. In this case, for instance, the control section 50, each time the operation accepting section 51 accepts a predetermined input operation (for example, the input operation illustrated in (b) of FIG. 18), alternately (i) limits the input operation accepting region to the above particular region and (ii) removes the limit.

The above particular region is set to cover, for example, an end surface on the upper side and two corners at the opposite ends of that end surface.

[Applications]

With reference to FIGS. 20 through 27, the description below deals with example relationships between (i) input operations on the outside surface A or B (that is, the outer edge of, for example, the display device 1) and (ii) predetermined functions (applications) to be performed.

FIGS. 20 through 27 each illustrate an example relationship between (i) an input operation on the outer edge of, for example, the display device 1 and (ii) a function to be performed, and illustrate example functions to be performed in response to different input operations described above and to combinations thereof. The relationships between the below-described input operations and functions to be performed are, however, mere examples: The display device 1 and others can each be arranged to, for such relationships, define any of various combinations depending on (i) input operations acceptable by, for example, the display device 1 and (ii) functions of, for example, the display device 1.

As with FIGS. 18 and 19, FIGS. 20 to 22 and 23 to 27 show double circles to each indicate a position of contact of a finger or the like or approach thereof, and FIGS. 20, 23, 24, 26, and 27 show (ii) arrows to each indicate a movement of the finger or the like.

FIG. 20 illustrates how a camera function is activated or set ready for activation in the case where (i) fingers have touched two positions on an end surface of the casing 17, which end surface is a portion of the outside surface A or B of the casing 17, and two positions on an end surface opposite to the above surface opposite (four positions in total; four-position touch) and (ii) the two fingers of the right hand, which are in contact one-to-one with the opposite end surfaces, are then moved along those end surfaces.

FIG. 20 illustrates a case in which two fingers of the right hand which are in contact one-to-one with the opposite end surfaces are moved. The present invention is, however, not limited to such an arrangement, and may be arranged, for instance, such that a camera function is activated or set ready for activation in the case where only the thumb of the right hand is moved, that is, one of the fingers or the like in contact with the four positions is moved.

With the above arrangement, the execution control section 53 activates a camera function or sets the camera function ready for activation in the case where the touch panel 14, 14*a*, or 14*b* has detected (i) contact of a finger or the like or approach thereof at two positions on a first end surface of the casing 17 and at two positions on a second end surface opposite to the first end surface and (ii) a movement, in the surface direction of the first and second end surfaces, of a finger or the like at at least one of the detection positions (in other words, in the case where the operation accepting section 51 has accepted an input operation based on those detections).

The trigger is not necessarily a movement such as the above. The camera function may be activated or set ready for activation in the case where fingers have touched two positions on an end surface of the casing 17 and two positions on another end surface opposite to the above end surface. With this arrangement, the execution control section 53 may activate the camera function or set the camera function ready for activation in the case where the touch panel 14, 14*a*, or 14*b* has detected contact of a finger or the like or approach thereof at two positions on an end surface of the casing 17 and at two positions on an end surface opposite to the above end surface (in other words, in the case where the operation accepting section 51 has accepted an input operation based on such a detection).

FIG. 20 illustrates an example case in which the user is holding, for example, the display device 1 in a landscape orientation (that is, the user is holding, for example, the display device 1 by the two long-side end surfaces). The description above referring to FIG. 20 applies also to a case where the user is holding, for example, the display device 1 in a portrait orientation (that is, the user is holding, for example, the display device 1 by the two short-side end surfaces).

FIG. 21 illustrates how, while the detecting function of the touch panel 14, 14*a*, or 14*b* is in a locked state, the detecting function becomes unlocked in the case where fingers have touched a plurality of positions on (i) an end surface of the casing 17, which end surface is a portion of the outside surface A or B of the casing 17, and (ii) another end surface opposite to the above end surface. FIG. 21 illustrates the user's left hand holding, for example, the display device 1 with (i) the thumb on one of the two long sides and (ii) the four fingers on the other long side opposite to the above long side. The present invention is, however, not limited to such an arrangement, and may be arranged, for instance, such that the detecting function is similarly unlocked in the case where the user's left hand is holding, for example, the display device 1 with (i) the thumb on one of the two long sides, (ii) the first finger on one of the two short sides, and (iii) the remaining three fingers on the other long side.

With the above arrangement, the execution control section 53 allows, for example, the display device 1 to accept a user operation in the case where the touch panel 14, 14a, or 14b has detected contact of a finger or the like or approach thereof at a single position on an end surface of the casing 17 and at a plurality of positions on another end surface of the casing 17 (in other words, in the case where the operation accepting section 51 has accepted an input operation based on such a detection).

The display device 1 and others are each preferably arranged such that even while the detecting function is in a locked state, the display panel 12 is constantly in an on-state and is capable of displaying an image. FIG. 21 illustrates an example case in which the user is holding, for example, the display device 1 in the left hand. The display device 1 and others may each be arranged such that holding, for example, the display device 1 in the right hand can also unlock the detecting function. Further, the display device 1 and others may each be arranged such that the detecting function is unlocked in a manner similar to the above even in the case where the display device 1 and others are each held in a landscape orientation. The description above applies also to this case except that the long-side detection positions and short-side detection positions are reversed (for instance, with (i) the thumb on one of the two short sides and (ii) the four fingers on the other short side opposite to the above).

FIG. 22 illustrates how, in the case where fingers have touched a plurality of positions on an end surface of the casing 17, which end surface is a portion of the outside surface A or B of the casing 17, and on another end surface opposite to the above end surface, the display device 1 and others each (i) determine, on the basis of how the fingers are in contact with, for example, the display device 1, whether the user is holding, for example, the display device 1 in the left hand or in the right hand and (ii) vary an image displayed (for example, how icons 60 [indicted by A to F in FIG. 22] are arranged).

With the above arrangement, the execution control section 53 determines how the user is holding, for example, the display device 1 (that is, whether the user is holding, for example, the display device 1 in the right hand or in the left hand) on the basis of a combination of detection positions, namely, a single position on an end surface of the casing 17 and a plurality of positions on another end surface of the casing 17 at which single and plurality of positions the touch panel 14, 14a, or 14b has detected contact of a finger or the like or approach thereof. Stated differently, the execution control section 53 determines the holding manner on the basis of a combination of positions at which the operation accepting section 51 has accepted an input operation based on the above detection.

(a) of FIG. 22 illustrates an example case in which the user is holding, for example, the display device 1 in the left hand. Specifically, (a) of FIG. 22 illustrates a case in which the user is holding, for example, the display device 1 with (i) the thumb on the left one of the two long sides, that is, the side on the left as viewed from the user viewing a display image (in other words, as viewed from the side of the front surface of the cover glass 16 or lens 18) and (ii) the four fingers on the right side (opposite to the left side), that is, the side on the right as viewed from the user viewing a display image (in other words, as viewed from the side of the front surface of the cover glass 16 or lens 18). In this case, the combination of detection positions is of one position on the left side and four positions on the right side.

As mentioned above with reference to FIG. 21, the user may be holding, for example, the display device 1 in the left hand with (i) the thumb on the left side, (ii) the first finger on the upper side, that is, the upper side as viewed from the user viewing a display image (in other words, as viewed from the side of the front surface of the cover glass 16 or lens 18), and (iii) the remaining three fingers on the right side. In this case, the combination of detection positions is of one position on the left side, one position on the upper side, and three positions on the right side.

(b) of FIG. 22 illustrates an example case in which the user is holding, for example, the display device 1 in the right hand. Specifically, (b) of FIG. 22 illustrates a case in which the user is holding, for example, the display device 1 with (i) the thumb on the right side and (ii) the four fingers on the left side. In this case, the combination of detection positions is of one position on the right side and four positions on the left side.

The user may be holding, for example, the display device 1 in the right hand with (i) the thumb on the right side, (ii) the first finger on the upper side, and (iii) the remaining three fingers on the left side. In this case, the combination of detection positions is of one position on the right side, one position on the upper side, and three positions on the left side.

As an example, the storage section 55 stores, in association with one another, (i) such combinations of detection positions as the above, (ii) holding manners (that is, identifiers each indicative of whether the user is holding, for example, the display device 1 in the left hand or in the right hand), and (iii) positional arrangements for individual icons 60.

The execution control section 53 refers to the storage section 55 to determine whether the user is holding, for example, the display device 1 in the right hand or in the left hand. The execution control section 53 then, on the basis of the result of the determination, changes the arrangement of icons between, for example, the arrangements illustrated respectively in (a) and (b) of FIG. 22. More specifically, as a result of the execution control section 53 selecting a positional arrangement for the icons 60 in correspondence with the holding manner, the display control section 54 causes the display panel 12 to display an image including the icons 60 arranged as selected.

Changing the arrangement of icons 60 as described above allows arranging the icons 60 at such positions that (i) in the case where the user is holding, for example, the display device 1 in the left hand, the user can easily operate, for example, the display device 1 with the right hand (dominant hand) and that (ii) in the case where the user is holding, for example, the display device 1 in the right hand, the user can easily operate, for example, the display device 1 with the left hand (dominant hand). In other words, the display device 1 and others can, by determining the holding manner, each optimize the arrangement of icons 60 (buttons) and display an image in correspondence with the holding manner (in other words, the user's dominant hand). The above arrangement can thus further improve the user's convenience.

FIG. 22 illustrates an example case in which the user is holding, for example, the display device 1 in a portrait orientation. The display device 1 and others may each be arranged to, even in the case where the user is holding, for example, the display device 1 in a landscape orientation, (i) determine the holding manner and (ii) change the display image (for example, the positional arrangement of icons 60) accordingly. The description above applies also to this case except that the long-side detection positions and short-side detection positions are reversed (for instance, with (i) the thumb on one of the two short sides and (ii) the four fingers on the other short side opposite to the above).

The description above deals with changing the arrangement of icons 60 as an example of controlling execution of a predetermined function on the basis of the result of determining the holding manner. The present invention is, however, not limited to such an arrangement. The execution control section 53 can, on the basis of the result of determining the holding manner, alternatively control execution of any of such various functions other than the above arrangement change as correcting coordinates detected by, for example, the touch panel 14. In other words, the display device 1 and others are each arranged to be capable of controlling execution of a function in correspondence with the holding manner. The above arrangement can thus improve the user's convenience.

FIG. 23 illustrates how, for instance, a page of a displayed booklet such as an electronic book is turned in synchronization with a movement of a finger or the like in the depth direction at an end surface of the casing 17, which end surface is a portion of the outside surface A or B of the casing 17.

With the above arrangement, in the case where the touch panel 14 or 14b has detected a movement of a finger or the like in a direction perpendicular to the display panel 12 (in other words, in the case where the operation accepting section 51 has accepted an input operation based on such a detection), the execution control section 53 enables a page turning function for a displayed image which page turning function is part of a booklet reading function.

FIG. 23 further illustrates an example in which in the case where fingers or the like have been moved in a single depth direction at two positions on end surfaces of the casing 17 (in FIG. 23, on an end surface and another end surface opposite thereto), the display device 1 and others each enlarge or shrink the displayed image in synchronization with the above movement. With this arrangement, the display device 1 and others each, for instance, (i) enlarge the image in synchronization with a movement of fingers or the like in a direction toward which the image is displayed and (ii) shrink the image in synchronization with a movement of fingers or the like in the opposite direction.

With the above arrangement, in the case where the touch panel 14 or 14b has detected a movement of fingers or the like in a direction perpendicular to the display panel 12 (in other words, in the case where the operation accepting section 51 has accepted an input operation based on such a detection), the execution control section 53 enables a scaling function for a displayed image in correspondence with the direction of the movement.

The execution control section 53 may further be arranged to, in the case where the touch panel 14 or 14b has detected a movement of fingers or the like from the front surface of, for example, the display device 1 (that is, the front surface of the cover glass 16 or lens 18) toward the bottom of the casing 17 in a direction perpendicular to the front surface (in other words, in the case where the operation accepting section 51 has accepted an input operation based on such a detection), cause an image to slide to follow the fingers or the like moving.

FIG. 24 illustrates how the display device 1 and others each show a user interface of dial rotation in synchronization with a movement of a finger or the like from an end surface of the casing 17 (which end surface is a portion of the outside surface A or B of the casing 17) along a corner of, for example, the display device 1 to an end surface adjacent to the above end surface.

With the above arrangement, in the case where the touch panel 14, 14a, or 14b has detected a movement of a finger or the like at a single position in a particular region (which covers (i) a joint between two adjacent end surfaces and (ii) the vicinity of the joint) in the surface direction of the particular region (in other words, in the case where the operation accepting section 51 has accepted an input operation based on such a detection), the execution control section 53 changes the state of execution of a predetermined function in response to the movement of the finger or the like.

FIG. 24 shows that the display device 1 and others each cause a dial to turn in response to a movement of a finger or the like at a corner and thus allow the user to change the state of execution of a predetermined function. Examples of the predetermined function in this case include (i) a function of adjusting the volume, (ii) a function of adjusting the luminance (brightness) of the backlight 11, (iii) a function of turning calendar dates, and (iv) a function of switching channels for broadcast programs or the like. Changing the state of execution of a predetermined function means such adjustment or switching, for example.

The display device 1 and others may each be arranged to, as illustrated in FIG. 24, change the position of the dial in correspondence with the tilt of, for example, the display device 1. FIG. 24 shows an example in which the display device 1 and others are each controlled to display a dial at an upper right corner regardless of whether the user is holding, for example, the display device 1 in a portrait orientation or in a landscape orientation. With this arrangement, (i) an acceleration sensor (not shown) included in, for example, the display device 1 detects a tilt of, for example, the display device 1, and (ii) the execution control section 53 compares the value of the detected tilt with a preset value. This allows, for example, the display device 1 to (i) determine whether the user is holding, for example, the display device 1 in a portrait orientation or in a landscape orientation and (ii) change the display position of the dial accordingly. This arrangement allows, for example, the display device 1 to, regardless of how the user is holding, for example, the display device 1, display a dial at the same position as viewed from the user, and can consequently improve the user's operability of such a dial.

The above detection of the tilt of, for example, the display device 1 with use of an acceleration sensor can be performed through a known technique. The detection of the tilt is thus not described here in detail. FIG. 24 illustrates an example case in which a dial is displayed constantly at an upper right corner. The present invention is, however, not limited to such an arrangement, and may constantly display a dial at any corner.

FIG. 25 illustrates how a predetermined game application is activated or set ready for activation in response to a finger or the like touching, for example, the display device 1 at a single position.

With the above arrangement, in the case where the touch panel 14, 14a, or 14b has detected contact of a finger or the like or approach thereof at a single position on an end surface of the casing 17 (in other words, in the case where the operation accepting section 51 has accepted an input operation based on such a detection), the execution control section 53 either activates a predetermined game application installed on, for example, the display device 1 or sets the game application ready for activation.

FIG. 26 illustrates how the display device 1 and others, (i) in the case where a finger or the like has touched, for example, the display device 1 at a single position, each display a selection image that allows the user to select a predetermined function (in FIG. 26, a guidance image that allows the user to select either "Sleep" or "Power off") and (ii) in the case where the touch panel 14, 14a, or 14b has then detected a movement of the finger or the like in contact with that end surface being touched (or a further movement of the finger or the like off the end surface after the above movement (flick)), allow a predetermined function (in FIG. 26, "Sleep") to be selected in correspondence with the direction of the movement.

With the above arrangement, in the case where the touch panel 14, 14a, or 14b has detected contact of a finger or the like or approach thereof at a single position on an end surface of the casing 17, the execution control section 53 causes a selection image to be displayed which allows the user to select a predetermined function. Then, in the case where the touch panel 14, 14a, or 14b has detected a movement of the finger or the like (or a further movement of the finger or the like off that end surface after the above movement), the execution control section 53 selects a predetermined function in correspondence with the direction of the movement to perform that function. The operation accepting section 51 has accepted an input operation based on the above detections.

FIG. 27 illustrates how an image displayed is enlarged, shrunk, or minimized in the case where fingers or the like come into contact one-to-one with two adjacent end surfaces that form a corner and are then moved toward that corner. The minimization is a function of switching an image displayed on a browser to a single button image to be displayed at an end of the display region P. This function is similar to the Windows (registered trademark) function assigned to the "minimize" button.

With the above arrangement, in the case where the touch panel 14, 14a, or 14b has detected, at two positions in a particular region covering (i) a joint between two adjacent end surfaces and (ii) the vicinity of the joint, a movement of a finger or the like in the surface direction of the particular region (in other words, in the case where the operation accepting section 51 has accepted an input operation based on such a detection), the execution control section 53 enables the function of scaling a displayed image or the function of minimizing a displayed image.

As described above, the touch panel 14, 14a, or 14b allows, for example, the display device 1 to control execution of predetermined functions in accordance with various intuitive input operations such as a finger(s) or the like sliding along an end surface, pinching a corner, and touching two opposite end surfaces (and moving along the end surfaces), and a hand holding, for example, the display device 1. This arrangement can provide the user with an intuitive, easy-to-use user interface. In addition, the above arrangement allows the user to switch input operations to correspond to any predetermined function, and can thus improve flexibility (convenience).

[Recap]

A display device of one mode of the present invention is a display device, including: a display screen; an operation detecting member overlapping with the display screen and configured to detect (i) contact of a target object with a display region of the display screen or (ii) approach of the target object to the display region of the display screen; and a casing containing the display screen and the operation detecting member, a minimum distance between the operation detecting member and an outside surface of the casing, the outside surface being separate from the display region, being not larger than a detectable distance, within which the operation detecting member is capable of detecting (i) the contact of the target object with the outside surface or (ii) the approach of the target object to the outside surface.

The above arrangement makes it possible to detect (i) contact of a target object with an outside surface of the casing, the outside surface being separate from the display region, or (ii) approach thereof to the outside surface. With the above arrangement, the display device does not necessarily detect contact of a target object or approach thereof over an image displayed on the display screen. The display device can therefore, without decreasing the viewability or operability of the image, accept an operation performed with use of a target object.

The "outside surface of the casing" covers not only the outside surface A of the casing 17 but also the surface of a portion of the cover glass 16 or lens 18 which portion is in a cutout shape. In other words, the "outside surface of the casing" also covers the outside surface B illustrated in (b) of FIG. 1. The outside surfaces A and B further cover side surfaces of, for example, the display device 1.

The present embodiment uses a touch panel 14 as an example of the operation detecting member. The operation detecting member is, however, not limited to a touch panel, and may be any member (such as an optical sensor) capable of detecting contact of a target object or approach thereof.

The display device of one mode of the present invention may preferably be arranged such that the minimum distance is not larger than the detectable distance at least at an end surface of the casing, which end surface is a portion of the outside surface of the casing.

The above arrangement makes it possible to detect contact of a target object with at least an end surface or approach thereof to at least an end surface.

The display device of one mode of the present invention may preferably be arranged such that the operation detecting member includes an electrode group for detecting the contact of or the approach of the target object; the minimum distance is a first distance, which is between (i) each electrode of an outer edge electrode group, which is included in the electrode group and which is arranged along an outer edge of the operation detecting member, and (ii) the outside surface of the casing; and the first distance is not larger than a second distance, which is in a direction perpendicular to the display screen and which is between the operation detecting member and a front surface of the display device.

The above arrangement makes it possible to reliably detect contact of a target object with the outside surface of the casing or approach thereof to the outside surface.

The display device of one mode of the present invention may preferably be arranged such that the operation detecting member is provided with a transparent plate-shaped member; and the plate-shaped member has an end in a cutout shape.

The above arrangement can increase the detection accuracy of the operation detecting member at the outside surface of the casing.

The display device of one mode of the present invention may preferably be arranged such that the plate-shaped member is an optical member for changing a direction in which light emitted from the display screen travels.

With the above arrangement, the cutout shape changes the direction of travel of light emitted from the display screen and thus allows such light to be emitted also from a region (non-display region) located outside of the display screen. The above arrangement can thus increase the viewing angle of a display image (that is, a display region as viewed by the user).

The display device of one mode of the present invention may preferably be arranged such that the casing includes a material having a large dielectric constant.

The above arrangement can increase the detection accuracy at the outside surface of the casing, and can thus increase the range of detection over the detectable distance.

The "material having a large dielectric constant" refers to a material having a dielectric constant that allows the operation detecting member to easily detect contact of a target object with the outside surface of the casing or approach thereof to the outside surface.

The display device of one mode of the present invention may preferably be arranged such that the operation detecting member detects the contact of or the approach of the target object at a single position on an end surface of the casing, which end surface is a portion of the outside surface of the casing.

The above arrangement allows a single-position detection of a target object at an end surface of the casing, and thus allows the display device to perform a function in response to such a single-position detection.

The display device of one mode of the present invention may preferably be arranged such that the operation detecting member detects the contact of or the approach of the target object at a plurality of positions on an end surface of the casing, which end surface is a portion of the outside surface of the casing.

The above arrangement allows a multiple-position detection of a target object at an end surface of the casing, and thus allows the display device to perform a function in response to such a multiple-position detection. The above arrangement can further prevent an operation mistake (that is, contact or approach of a target object which contact or approach does not intend to control execution of a predetermined function) that may occur in the case of a single-position detection.

The display device of one mode of the present invention may preferably be arranged such that the operation detecting member detects the contact of or the approach of the target object at (i) a single position on an end surface of the casing and (ii) a plurality of positions on another end surface of the casing.

The above arrangement makes it possible to detect contact of a target object or approach thereof at a single position on an end surface and a plurality of positions on another end surface. The above arrangement thus allows the display device to perform a function in response to such contact or approach.

The display device of one mode of the present invention may preferably be arranged such that the operation detecting member detects a movement of the target object in a surface direction of an end surface of the casing.

The above arrangement makes it possible to detect a movement of a target object at an end surface, and thus allows the display device to perform a function in response to such a movement.

The display device of one mode of the present invention may preferably be arranged such that the operation detecting member detects a movement of the target object in a particular region including (i) a joint between two adjacent end surfaces of the casing and (ii) a vicinity of the joint.

The above arrangement makes it possible to detect a movement of a target object in the particular region, and thus allows the display device to perform a function in response to such a movement in the particular region.

The display device of one mode of the present invention may preferably be arranged such that the operation detecting member detects a movement of the target object in (i) a surface direction of a first end surface of the casing and (ii) a surface direction of a second end surface of the casing, which second end surface faces the first end surface.

The above arrangement makes it possible to detect a movement of a target object at a first end surface and a second end surface facing the first end surface, and thus allows the display device to perform a function in response to a movement of a target object at such a plurality of positions.

The display device of one mode of the present invention may preferably be arranged such that the operation detecting member detects a movement of the target object in a direction perpendicular to the display screen.

The above arrangement makes it possible to detect a movement of a target object in the perpendicular direction, and thus allows the display device to perform a function in response to such a movement in the perpendicular direction.

The display device of one mode of the present invention may preferably be arranged such that the operation detecting member is capable of detecting the contact of or the approach of the target object over a region that is so set as to be capable of being limited to a first end surface of the casing and a particular region including (i) a joint between the first end surface and a second end surface adjacent to the first end surface and (ii) a vicinity of the joint.

The above arrangement can reduce the risk of an operation mistake causing the display device to perform a function accidentally.

The display device of one mode of the present invention may preferably further include: an execution control section for controlling execution of a predetermined function of the display device, wherein in a case where the operation detecting member has detected the contact of or the approach of the target object at (i) a first end surface of the casing and (ii) a second end surface of the casing, which second end surface faces the first end surface, the execution control section either activates a camera function as part of the predetermined function or sets the camera function ready to be activated.

The display device of one mode of the present invention may preferably further include: an execution control section for controlling execution of a predetermined function of the display device, wherein in a case where the operation detecting member has detected the contact of or the approach of the target object at (i) a first end surface of the casing and (ii) a second end surface of the casing, which second end surface faces the first end surface, and has then detected, at at least one of positions of the detection, a movement of the target object in (i) a surface direction of the first end surface and (ii) a surface direction of the second end surface, the execution control section either activates a camera function as part of the predetermined function or sets the camera function ready to be activated.

The above arrangement makes it possible to either activate a camera function or set the camera function ready for activation in accordance with an intuitive input operation such as the above.

The display device of one mode of the present invention may preferably further include: an execution control section for controlling execution of a predetermined function of the display device, wherein in a case where the operation detecting member has detected the contact of or the approach of the target object at (i) a single position on an end surface of the casing and (ii) a plurality of positions on another end surface of the casing, the execution control section is allowed to accept a user operation for the predetermined function.

The above arrangement makes it possible to accept a user operation in accordance with an intuitive input operation such as the above.

The display device of one mode of the present invention may preferably further include: an execution control section for controlling execution of a predetermined function of the display device, wherein: the execution control section determines, on a basis of a combination, for a case where the operation detecting member has detected the contact of or the approach of the target object at (i) a single position on an end surface of the casing and (ii) a plurality of positions on another end surface of the casing, of the single and plurality of positions of the detection of the contact of or the approach of the target object, a manner in which a user is holding the display device; and the execution control section controls the execution of the predetermined function on a basis of a result of the determination.

The above arrangement makes it possible to control execution of a predetermined function in correspondence with a holding manner determined on the basis of an intuitive input operation such as the above. The above arrangement can thus further improve the user's convenience.

The display device of one mode of the present invention may preferably further include: an execution control section for controlling execution of a predetermined function of the display device, wherein in a case where the operation detecting member has detected a movement of the target object in a direction perpendicular to the display screen, the execution control section enables a page turning function for a displayed image, the page turning function being part of a booklet reading function as part of the predetermined function.

The above arrangement makes it possible to enable a page turning function in accordance with an intuitive input operation such as the above.

The display device of one mode of the present invention may preferably further include: an execution control section for controlling execution of a predetermined function of the display device, wherein in a case where the operation detecting member has detected a movement of the target object in a direction that extends from a front surface of the display device to a bottom of the casing and that is perpendicular to the front surface, the execution control section slides an image in such a manner that the image moves in the direction of the movement of the target object.

The above arrangement makes it possible to cause an image to slide in accordance with an intuitive input operation such as the above.

The display device of one mode of the present invention may preferably further include: an execution control section for controlling execution of a predetermined function of the display device, wherein in a case where the operation detecting member has detected a movement of the target object in a surface direction of the particular region at a single position in the particular region, the execution control section changes a state of the execution of the predetermined function in response to the movement of the target object.

The above arrangement makes it possible to change the state of execution of a predetermined function in accordance with an intuitive input operation such as the above.

The display device of one mode of the present invention may preferably be arranged such that the predetermined function is a function of adjusting a volume; and the execution control section adjusts the volume in response to the movement of the target object.

The above arrangement makes it possible to adjust the volume in accordance with an intuitive input operation such as the above.

The display device of one mode of the present invention may preferably further include: an execution control section for controlling execution of a predetermined function of the display device, in a case where the operation detecting member has detected a movement of the target object in a surface direction of the particular region at two positions in the particular region, the execution control section enables a function of scaling a displayed image or a function of minimizing the displayed image, the scaling function and the minimizing function each being part of the predetermined function.

The above arrangement makes it possible to enable an image scaling function or image minimizing function in accordance with an intuitive input operation such as the above.

A portable terminal of one mode of the present invention includes the display device.

A monitor of one mode of the present invention includes the display device.

A television of one mode of the present invention includes the display device.

The above arrangements each allow a display device of one mode of the present invention to function as a portable terminal, a monitor, or a television.

A display device of one mode of the present invention is a display device, including: a display screen; a first operation detecting member overlapping with the display screen and configured to detect (i) contact of a target object with a display region of the display screen or (ii) approach of the target object to the display region of the display screen; a casing containing the display screen and the first operation detecting member; and a second operation detecting member for detecting (i) the contact of the target object with an outside surface of the casing, the outside surface being separate from the display region and including an outer edge of the casing, or (ii) the approach of the target object to the outside surface.

The above arrangement makes it possible to detect (i) contact of a target object with an outside surface of the casing, the outside surface being separate from the display region, or (ii) approach thereof to the outside surface. With the above configuration, the display device does not necessarily detect contact of a target object or approach thereof over an image displayed on the display screen. The display device can therefore, without decreasing the viewability or operability of the image, accept an operation performed with use of a target object.

The present embodiment uses a touch panel 14a or 14b as an example of the operation detecting member. The operation detecting member is, however, not limited to a touch panel, and may be any member (such as an optical sensor) capable of detecting contact of a target object or approach thereof.

A display device of one mode of the present invention is a display device for displaying an image, the display device including: an operation accepting section for, in order to control the image display, accepting an input operation performed with use of a target object at an outer edge of the display device.

A method of one mode of the present invention for controlling a display device is a method for controlling a display device for displaying an image, the method including the step of: in order to control the image display, accepting an input operation performed with use of a target object at an outer edge of the display device.

The above arrangement makes it possible to accept an input operation performed with use of a target object on at least an outer edge of the display device (that is, a region other than the display region).

The display device of one mode of the present invention may preferably be arranged such that the operation accepting section accepts an input operation at a single position on the outer edge of the display device.

The above arrangement allows a single-position detection of a target object at an end surface of the casing, and thus allows the display device to perform a function in response to an input operation based on such a single-position detection.

The display device of one mode of the present invention may preferably be arranged such that the operation accepting section accepts an input operation at a plurality of positions on the outer edge of the display device.

The above arrangement allows a multiple-position detection of a target object at an end surface of the casing, and thus allows the display device to perform a function in response to an input operation based on such a multiple-position detection. The above arrangement can further prevent an operation mistake that may occur in the case of a single-position detection.

The display device of one mode of the present invention may preferably be arranged such that the operation accepting section accepts an input operation at (i) a single position on an end surface of the display device, which end surface is a portion of the outer edge of the display device, and (ii) a plurality of positions on another end surface of the display device.

The above arrangement makes it possible to detect contact of a target object or approach thereof at a single position on an end surface and a plurality of positions on another end surface. The above arrangement thus allows the display device to perform a function in response to an input operation based on such a detection.

The display device of one mode of the present invention may preferably be arranged such that the input operation accepted by the operation accepting section is a movement of the target object in a surface direction of an end surface of the display device, which end surface is a portion of the outer edge of the display device.

The above arrangement makes it possible to detect a movement of a target object at an end surface, and thus allows the display device to perform a function in response to such a movement.

The display device of one mode of the present invention may preferably be arranged such that the input operation accepted by the operation accepting section is a movement of the target object in a particular region including (i) a joint between two adjacent end surfaces of the display device, which end surfaces are each a portion of the outer edge of the display device, and (ii) a vicinity of the joint.

The above arrangement makes it possible to detect a movement of a target object in the particular region, and thus allows the display device to perform a function in response to such a movement in the particular region.

The display device of one mode of the present invention may preferably be arranged such that the input operation accepted by the operation accepting section is a movement of the target object in (i) a surface direction of a first end surface of the display device, which first end surface is a portion of the outer edge of the display device, and (ii) a surface direction of a second end surface of the display device, which second end surface faces the first end surface.

The above arrangement makes it possible to detect a movement of a target object at a first end surface and a second end surface facing the first end surface, and thus allows the display device to perform a function in response to a movement of a target object at such a plurality of positions.

The display device of one mode of the present invention may preferably be arranged such that the input operation accepted by the operation accepting section is a movement of the target object in a direction perpendicular to the display screen of the display device.

The above arrangement makes it possible to detect a movement of a target object in the perpendicular direction, and thus allows the display device to perform a function in response to such a movement in the perpendicular direction.

The display device of one mode of the present invention may preferably be arranged such that the input operation is accepted by the operation accepting section over a region that is so set as to be capable of being limited to a first end surface of the display device, which end surface is a portion of the outer edge of the display device, and a particular region including (i) a joint between the first end surface and a second end surface adjacent to the first end surface and (ii) a vicinity of the joint.

The above arrangement can reduce the risk of an operation mistake causing the display device to perform a function accidentally.

The display device of one mode of the present invention may preferably further include: a display screen; an operation detecting member overlapping with the display screen and configured to detect (i) contact of the target object with a display region of the display screen or (ii) approach of the target object to the display region of the display screen; and a casing containing the display screen and the operation detecting member, wherein a minimum distance between the operation detecting member and an outside surface of the casing, the outside surface including an outer edge of the display device and being separate from the display region, is not larger than a detectable distance, within which the operation detecting member is capable of detecting (i) the contact of the target object with the outside surface or (ii) the approach of the target object to the outside surface.

The above arrangement makes it possible to detect (i) contact of a target object with an outside surface of the casing, the outside surface being separate from the display region, or (ii) approach thereof to the outside surface. With the above arrangement, the display device does not necessarily detect contact of a target object or approach thereof over an image displayed on the display screen. The display device can therefore, without decreasing the viewability or operability of the image, accept an operation performed with use of a target object.

A display device of one mode of the present invention is a display device for displaying an image, the display device including: an operation accepting section for accepting an input operation performed with use of a target object at an outer edge of the display device; an execution control section for controlling execution of a predetermined function in response to the input operation accepted by the operation accepting section; and a display control section for displaying the image on a display screen in accordance with the execution of the predetermined function which execution is controlled by the execution control section.

A method of one mode of the present invention for controlling a display device is a method for controlling a display device for displaying an image, the method including the steps of: (a) accepting an input operation performed with use of a target object at an outer edge of the display device; (b) controlling execution of a predetermined function in response to the input operation accepted in the step (a); and (c) displaying the image on a display screen in accordance with the execution of the predetermined function which execution is controlled in the step (b).

The above arrangement causes a predetermined function to be performed in accordance with an input operation accepted, and thus makes it possible to control execution of predetermined functions in accordance with various intuitive input operations. The above arrangement further makes it possible to display an image in correspondence with the function performed, and can thus provide the user with an intuitive, easy-to-use user interface.

The display device of one mode of the present invention may preferably be arranged such that in a case where the operation accepting section has accepted input operations at (i) a first end surface of the display device, which first end surface is a portion of the outer edge of the display device, and (ii) a second end surface of the display device, which second end surface faces the first end surface, the execution control section either activates a camera function as part of the predetermined function or sets the camera function ready to be activated.

The display device of one mode of the present invention may preferably be arranged such that in a case where the operation accepting section has accepted input operations at (i) a first end surface of the display device, which end surface is a portion of the outer edge of the display device, and (ii) a second end surface of the display device, which second end surface faces the first end surface, and has accepted at least one of the input operations as an movement of the target object in (i) a surface direction of the first end surface and (ii) a surface direction of the second end surface, the execution control section either activates a camera function as part of the predetermined function or sets the camera function ready to be activated.

The above arrangement makes it possible to either activate a camera function or set the camera function ready for activation in accordance with an intuitive input operation such as the above.

The display device of one mode of the present invention may preferably be arranged such that in a case where the operation accepting section has accepted input operations at (i) a single position on an end surface of the display device, which end surface is a portion of the outer edge of the display device, and (ii) a plurality of positions on another end surface of the display device, the execution control section is allowed to accept a user operation for the predetermined function.

The above arrangement makes it possible to enable a page turning function in accordance with an intuitive input operation such as the above.

The display device of one mode of the present invention may preferably be arranged such that the execution control section determines, on a basis of a combination, for a case where the operation accepting section has accepted input operations at (i) a single position on an end surface of the casing and (ii) a plurality of positions on another end surface of the display device, of the single and plurality of positions of the acceptance of the input operations, a manner in which a user is holding the display device; and the execution control section controls the execution of the predetermined function on a basis of a result of the determination.

The above arrangement makes it possible to control execution of a predetermined function in correspondence with a holding manner determined on the basis of an intuitive input operation such as the above. The above arrangement can thus further improve the user's convenience.

The display device of one mode of the present invention may preferably be arranged such that in a case where the operation accepting section has accepted the input operation as a movement of the target object in a direction perpendicular to the display screen, the execution control section enables a page turning function for a displayed image, the page turning function being part of a booklet reading function as part of the predetermined function.

The above arrangement makes it possible to enable a page turning function in accordance with an intuitive input operation such as the above.

The display device of one mode of the present invention may preferably be arranged such that in a case where the operation accepting section has accepted the input operation as a movement of the target object in a direction that extends from a front surface of the display device to a bottom of the display device and that is perpendicular to the front surface, the execution control section slides an image in such a manner that the image moves in the direction of the movement of the target object.

The above arrangement makes it possible to cause an image to slide in accordance with an intuitive input operation such as the above.

The display device of one mode of the present invention may preferably be arranged such that in a case where the operation accepting section has accepted, at a single position in a particular region including (i) a joint between two adjacent end surfaces of the display device, which end surfaces are each a portion of the outer edge of the display device, and (ii) a vicinity of the joint, the input operation as a movement of the target object in a surface direction of the particular region, the execution control section changes a state of the execution of the predetermined function in response to the movement of the target object.

The above arrangement makes it possible to change the state of execution of a predetermined function in accordance with an intuitive input operation such as the above.

The display device of one mode of the present invention may preferably be arranged such that the predetermined function is a function of adjusting a volume; and the execution control section adjusts the volume in response to the movement of the target object.

The above arrangement makes it possible to adjust the volume in accordance with an intuitive input operation such as the above.

The display device of one mode of the present invention may preferably be arranged such that in a case where the operation accepting section has accepted, at two positions in a particular region including (i) a joint between two adjacent end surfaces of the display device, which end surfaces are each a portion of the outer edge of the display device, and (ii) a vicinity of the joint, the input operation as a movement of the target object in a surface direction of the particular region, the execution control section enables a function of scaling a displayed image or a function of minimizing the displayed image, the scaling function and the minimizing function each being part of the predetermined function.

The above arrangement makes it possible to enable an image scaling function or image minimizing function in accordance with an intuitive input operation such as the above.

The display device of one mode of the present invention may preferably further include: a display screen; an operation detecting member overlapping with the display screen and configured to detect (i) contact of the target object with a display region of the display screen or (ii) approach of the target object to the display region of the display screen; and a casing containing the display screen and the operation detecting member, wherein a minimum distance between the operation detecting member and an outside surface of the casing, the outside surface including an outer edge of the display device and being separate from the display region, is not larger than a detectable distance, within which the operation detecting member is capable of detecting (i) the contact of the target object with the outside surface or (ii) the approach of the target object to the outside surface.

The above arrangement makes it possible to detect (i) contact of a target object with an outside surface of the casing, the outside surface being separate from the display region, or (ii) approach thereof to the outside surface. With the above arrangement, the display device does not necessarily detect contact of a target object or approach thereof over an image displayed on the display screen. The display device can therefore, without decreasing the viewability or operability of the image, accept an operation performed with use of a target object.

[Software Implementation Example]

Finally, blocks of the display devices 1 to 4 and 4*a*, particularly the control section 50 (the operation accepting section 51, the input operation determining section 52, the execution control section 53, and the display control section 54) may be realized by a logic circuit (hardware) provided in an integrated circuit (IC chip), or may be realized by software as executed by a central processing unit (CPU).

In the case where the blocks are realized by software, the display devices 1 to 4 and 4*a* each include a CPU and memory devices (memory media). The CPU executes instructions in control programs realizing the functions. The memory devices include a read only memory (ROM) which contains programs, a random access memory (RAM) to which the programs are loaded, and a memory containing the programs and various data. The object of the present invention can also be achieved by mounting to the display devices 1 to 4 and 4*a* a computer-readable storage medium containing control program code (executable program, intermediate code program, or source program) for the display devices 1 to 4 and 4*a*, which is software realizing the aforementioned functions, in order for the computer (or CPU, MPU) to retrieve and execute the program code contained in the storage medium.

The storage medium may be a non-transitory tangible medium, for example, a tape such as a magnetic tape or cassette tape; a magnetic disk such as a floppy (registered trademark) disk or hard disk, or an optical disk such as a CD-ROM, MO, MD, DVD, or CD-R; a card such as an IC card (memory card) or optical card; a semiconductor memory such as a mask ROM, EPROM, EEPROM (registered trademark), or flash ROM; or a logic circuit such as a programmable logic device (PLD) or field programmable gate array (FPGA).

The display devices 1 to 4 and 4*a* may each be arranged to be connectable to a communications network so that the program code may be delivered over the communications network. The communications network is not limited in any particular manner as long as it allows transmission of program code, and may be, for example, the Internet, an intranet, extranet, LAN, ISDN, VAN, CATV communications network, virtual dedicated network, telephone line network, mobile communications network, or satellite communications network. The transfer medium which makes up the communications network is not limited to any particular arrangement or kind as long as it allows transmission of program code, and may be, for example, wired line such as IEEE 1394, USB, electric power line, cable TV line, telephone line, or asynchronous digital subscriber loop (ADSL) line; or wireless, such as infrared radiation (IrDA, remote control), Bluetooth (registered trademark), 802.11 wireless, high data rate (HDR), near field communication (NFC), digital living network alliance (DLNA) (registered trademark), mobile telephone network, satellite line, or terrestrial digital network. The present invention can be achieved by use of a computer data signal embodied in a carrier wave which signal is formed by electronic transmission of the program code.

[Supplemental Notes]

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

INDUSTRIAL APPLICABILITY

The present invention is capable of detecting (i) contact of a finger or the like with an outer edge of a display device (that is, an outside surface of a casing of the display device) or (ii) approach thereof to the outer edge. The present invention is thus particularly applicable to, for example, multifunction mobile telephones, tablet computers, monitors, and televisions.

REFERENCE SIGNS LIST

1 display device (display device, portable terminal, monitor, television)
2 display device (display device, portable terminal, monitor, television)
3 display device (display device, portable terminal, monitor, television)
4 display device (display device, portable terminal, monitor, television)
4*a* display device (display device, portable terminal, monitor, television)
12 display panel (display screen)
14 touch panel (operation detecting member, first operation detecting member)
14*a* touch panel (second operation detecting member)
14*b* touch panel (second operation detecting member)
16 cover glass (plate-shaped member)
17 casing 18 lens (plate-shaped member, optical member)
31 detection electrode (electrode group)
31a detection electrode (electrode group, outer edge electrode group)
32 drive electrode (electrode group)
32a drive electrode (electrode group, outer edge electrode group)
51 operation accepting section
53 execution control section
54 display control section
60 icon (operation input image)
94 fingertip (target object)
A outside surface (outside surface, end surface, other end surface, opposite end surface, outer edge of display device)
B outside surface (outside surface, end surface, other end surface, opposite end surface, outer edge of display device)
P display region
d minimum distance (minimum distance, first distance)
d1 second distance

The invention claimed is:

1. A display device, comprising:
a display screen;
an operation detecting member which entirely overlaps the display screen in a plan view to detect (i) contact of a target object with a display region of the display screen or (ii) approach of the target object to the display region of the display screen;
a transparent member entirely covering the operation detecting member;
a casing containing the display screen and the operation detecting member; and
a wire containing section between the display region and the casing, wherein
a minimum distance d between (i) an outside surface of the casing and the transparent member, and (ii) the operation detecting member, the outside surface being outside of the display region, (a) is not longer than a detectable distance, within which the operation detecting member is capable of detecting (i) the contact of the target object with the outside surface or (ii) the approach of the target object to the outside surface, and (b) is not longer than a distance d1, in a direction perpendicular to the display screen, which distance d1 extends between the operation detecting member and an outside surface of the transparent member.

2. The display device according to claim 1, wherein the minimum distance is not longer than the detectable distance at least at an end surface of the casing, which end surface is a portion of the outside surface of the casing.

3. The display device according to claim 1, wherein:
the operation detecting member includes an electrode group for detecting the contact of or the approach of the target object;
the minimum distance is a first distance, which is between (i) each electrode of an outer edge electrode group, which is included in the electrode group and which is arranged along an outer edge of the operation detecting member, and (ii) the outside surface of the casing; and
the first distance is not larger than a second distance, which is in a direction perpendicular to the display screen and which is between the operation detecting member and a front surface of the display device.

4. The display device according to claim 1, wherein the transparent member is an optical member that changes a direction in which light emitted from the display screen travels.

5. The display device according to claim 1, wherein the casing includes a material having a large dielectric constant.

6. The display device according to claim 1, wherein the operation detecting member detects the contact of or the approach of the target object at a single position on an end surface of the casing, which end surface is a portion of the outside surface of the casing.

7. The display device according to claim 1, wherein the operation detecting member detects the contact of or the approach of the target object at a plurality of positions on an end surface of the casing, which end surface is a portion of the outside surface of the casing.

8. The display device according to claim 7, wherein the operation detecting member detects the contact of or the approach of the target object at (i) a single position on an end surface of the casing and (ii) a plurality of positions on another end surface of the casing.

9. The display device according to claim 6, wherein the operation detecting member detects a movement of the target object in a surface direction of an end surface of the casing.

10. The display device according to claim 9, wherein the operation detecting member detects a movement of the target object in a particular region including (i) a joint between two adjacent end surfaces of the casing and (ii) a vicinity of the joint.

11. The display device according to claim 9, wherein the operation detecting member detects a movement of the target object in (i) a surface direction of a first end surface of the casing and (ii) a surface direction of a second end surface of the casing, which second end surface faces the first end surface.

12. The display device according to claim 9, wherein the operation detecting member detects a movement of the target object in a direction perpendicular to the display screen.

13. The display device according to claim 6, wherein the operation detecting member is capable of detecting the contact of or the approach of the target object over a region that is so set as to be capable of being limited to a first end surface of the casing and a particular region including (i) a joint between the first end surface and a second end surface adjacent to the first end surface and (ii) a vicinity of the joint.

14. The display device according to claim 7, further comprising:
an execution control section for controlling execution of a predetermined function of the display device, wherein
in a case where the operation detecting member has detected the contact of or the approach of the target object at (i) a first end surface of the casing and (ii) a second end surface of the casing, which second end surface faces the first end surface, the execution control section either activates a camera function as part of the predetermined function or sets the camera function ready to be activated.

15. The display device according to claim 7, further comprising:
an execution control section for controlling execution of a predetermined function of the display device, wherein
in a case where the operation detecting member has detected the contact of or the approach of the target object at (i) a first end surface of the casing and (ii) a second end surface of the casing, which second end surface faces the first end surface, and has then detected, at at least one of positions of the detection, a movement of the target object in (i) a surface direction of the first end surface and (ii) a surface direction of the second end surface, the execution control section either activates a camera function as part of the predetermined function or sets the camera function ready to be activated.

16. The display device according to claim 7, further comprising:
an execution control section for controlling execution of a predetermined function of the display device, wherein
in a case where the operation detecting member has detected the contact of or the approach of the target object at (i) a single position on an end surface of the casing and (ii) a plurality of positions on another end surface of the casing, the execution control section is allowed to accept a user operation for the predetermined function.

17. The display device according to claim 7, further comprising:
an execution control section that controls execution of a predetermined function of the display device, wherein:
the execution control section determines, on a basis of a combination, for a case where the operation detecting member has detected the contact of or the approach of the target object at (i) a single position on an end surface of the casing and (ii) a plurality of positions on another end surface of the casing, of the single and plurality of positions of the detection of the contact of or the approach of the target object, a manner in which a user is holding the display device; and
the execution control section controls the execution of the predetermined function on a basis of a result of the determination.

18. The display device according to claim 9, further comprising:
an execution control section that controls execution of a predetermined function of the display device, wherein
in a case where the operation detecting member has detected a movement of the target object in a direction perpendicular to the display screen, the execution control section enables a page turning function for a displayed image, the page turning function being part of a booklet reading function as part of the predetermined function.

19. The display device according to claim 9, further comprising:
an execution control section that controls execution of a predetermined function of the display device, wherein
in a case where the operation detecting member has detected a movement of the target object in a direction that extends from a front surface of the display device to a bottom of the casing and that is perpendicular to the front surface, the execution control section slides an image in such a manner that the image moves in the direction of the movement of the target object.

* * * * *